United States Patent
Suzuki et al.

(10) Patent No.: US 11,695,273 B2
(45) Date of Patent: Jul. 4, 2023

(54) POWER TRADING MANAGEMENT APPARATUS AND POWER TRADING SYSTEM

(71) Applicant: Hitachi, Ltd., Tokyo (JP)

(72) Inventors: Toshiaki Suzuki, Tokyo (JP); Yusuke Shomura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 241 days.

(21) Appl. No.: 17/148,636

(22) Filed: Jan. 14, 2021

(65) Prior Publication Data

US 2021/0234368 A1    Jul. 29, 2021

(30) Foreign Application Priority Data

Jan. 29, 2020  (JP) .................................. 2020-12190

(51) Int. Cl.
*H02J 3/00* (2006.01)
*H02J 3/06* (2006.01)
*G05F 1/66* (2006.01)

(52) U.S. Cl.
CPC ................ *H02J 3/008* (2013.01); *G05F 1/66* (2013.01); *H02J 3/007* (2020.01); *H02J 3/06* (2013.01)

(58) Field of Classification Search
CPC .... H02J 3/008; H02J 3/007; H02J 3/06; H02J 3/28; H02J 2300/20; H02J 3/381; G05F 1/66; Y04S 50/10
See application file for complete search history.

(56) References Cited

U.S. PATENT DOCUMENTS

| | | | |
|---|---|---|---|
| 9,866,024 B2* | 1/2018 | Ukita | H02J 3/32 |
| 2016/0226250 A1* | 8/2016 | Fukubayashi | H02J 3/008 |
| 2018/0178669 A1* | 6/2018 | Kudo | B60L 55/00 |
| 2018/0240201 A1* | 8/2018 | Eda | H02J 13/00002 |
| 2019/0058330 A1* | 2/2019 | Kobayashi | H02J 13/00002 |
| 2019/0190269 A1* | 6/2019 | de Hoog | H02J 7/007188 |

FOREIGN PATENT DOCUMENTS

| | | | | |
|---|---|---|---|---|
| JP | 2017-153274 A | 8/2017 | | |
| WO | WO-2017145457 A1 * | 8/2017 | ............. | G06Q 50/06 |

* cited by examiner

*Primary Examiner* — Mohammad Ali
*Assistant Examiner* — Dhruvkumar Patel
(74) *Attorney, Agent, or Firm* — Mattingly & Malur, PC

(57) ABSTRACT

A power trading management apparatus receives power supply application data including the amount of supplied power and a supply period from a supply-side computer, and receives power demand application data including the amount of requested power and a request period from a demand-side computer, determines whether or not a first trading condition in which the supply period is a period earlier than the request period is satisfied, decides the amount of transmitted power for a power demand apparatus based on an amount of power of the amount of supplied power or the amount of requested power when the first trading condition is satisfied, and stores the amount of supplied power in a power storage and discharge apparatus from a power supply apparatus in the supply period and discharges the amount of transmitted power decided by the decision processing to the power demand apparatus from the power storage and discharge apparatus.

14 Claims, 21 Drawing Sheets

FIG. 2

| TIME ZONE | SUPPLY OPERATOR | STORAGE AND DISCHARGE OPERATOR | DEMAND OPERATOR | TRADING ID |
|---|---|---|---|---|
| 10:00 - 10:59 | 20-1, 1[MW], 1[MWh], 10,000 YEN  A | | 30-1, 1[MW], 1[MWh], 10,000 YEN | T1 |
| 11:00 - 11:59 | | 101 | C | |
| 12:00 - 12:59 | 20-2, 1[MW], 1[MWh], 10,000 YEN  B | 102  POWER STORAGE AND DISCHARGE, 40-1, 1[MW], 1[MWh], 2,000 YEN  E | D | T2-1 |
| 13:00 - 13:59 | | | 30-2, 1[MW], 1[MWh], 10,000 YEN | T2-2 |

FIG. 3A

| MANAGEMENT ID | TRADING TYPE | TIME ZONE | POWER [[MW]] | AMOUNT OF POWER [[MWh]] | PRICE [YEN] | APPARATUS ID |
|---|---|---|---|---|---|---|
| S1 | SUPPLY | 10:00 – 10:59 | 1 | 1 | 10000 | 20-1 |
| S2 | SUPPLY | 12:00 – 12:59 | 1 | 1 | 10000 | 20-2 |

FIG. 3B

| MANAGEMENT ID | TRADING TYPE | TIME ZONE | POWER [[MW]] | AMOUNT OF POWER [[MWh]] | PRICE [YEN] | APPARATUS ID |
|---|---|---|---|---|---|---|
| D1 | DEMAND | 10:00 – 10:59 | 1 | 1 | 10000 | 30-1 |
| D2 | DEMAND | 13:00 – 13:59 | 1 | 1 | 10000 | 30-2 |

FIG. 3C

| MANAGEMENT ID | TRADING TYPE | TIME ZONE | POWER [[MW]] | AMOUNT OF POWER [[MWh]] | PRICE [YEN] | APPARATUS ID |
|---|---|---|---|---|---|---|
| K1 | POWER STORAGE AND DISCHARGE | 12:00 – 13:59 | 1 | 1 | 2000 | 40-1 |

FIG. 4A1

| PROCESSING TYPE (401) | TRADING TYPE (402) | TIME ZONE (403) | POWER [[MW]] (404) | AMOUNT OF POWER [[MWh]] (405) | PRICE [YEN] (406) | APPARATUS ID (407) |
|---|---|---|---|---|---|---|
| APPLICATION (411) | SUPPLY | 10:00 – 10:59 | 1 | 1 | 10000 | 20-1 |

FIG. 4A2

| PROCESSING TYPE (401) | TRADING TYPE (402) | TIME ZONE (403) | POWER [[MW]] (404) | AMOUNT OF POWER [[MWh]] (405) | PRICE [YEN] (406) | APPARATUS ID (407) |
|---|---|---|---|---|---|---|
| APPLICATION (412) | SUPPLY | 12:00 – 12:59 | 1 | 1 | 10000 | 20-2 |

FIG. 4B1

| PROCESSING TYPE (401) | TRADING TYPE (402) | TIME ZONE (403) | POWER [[MW]] (404) | AMOUNT OF POWER [[MWh]] (405) | PRICE [YEN] (406) | APPARATUS ID (407) |
|---|---|---|---|---|---|---|
| APPLICATION (421) | DEMAND | 10:00 – 10:59 | 1 | 1 | 10000 | 30-1 |

FIG. 4B2

| PROCESSING TYPE (401) | TRADING TYPE (402) | TIME ZONE (403) | POWER [[MW]] (404) | AMOUNT OF POWER [[MWh]] (405) | PRICE [YEN] (406) | APPARATUS ID (407) |
|---|---|---|---|---|---|---|
| APPLICATION (422) | DEMAND | 13:00 – 13:59 | 1 | 1 | 10000 | 30-2 |

FIG. 4C

| PROCESSING TYPE (401) | TRADING TYPE (402) | TIME ZONE (403) | POWER [[MW]] (404) | AMOUNT OF POWER [[MWh]] (405) | PRICE [YEN] (406) | APPARATUS ID (407) |
|---|---|---|---|---|---|---|
| APPLICATION (431) | POWER STORAGE AND DISCHARGE | 12:00 – 13:59 | 1 | 1 | 2000 | 40-1 |

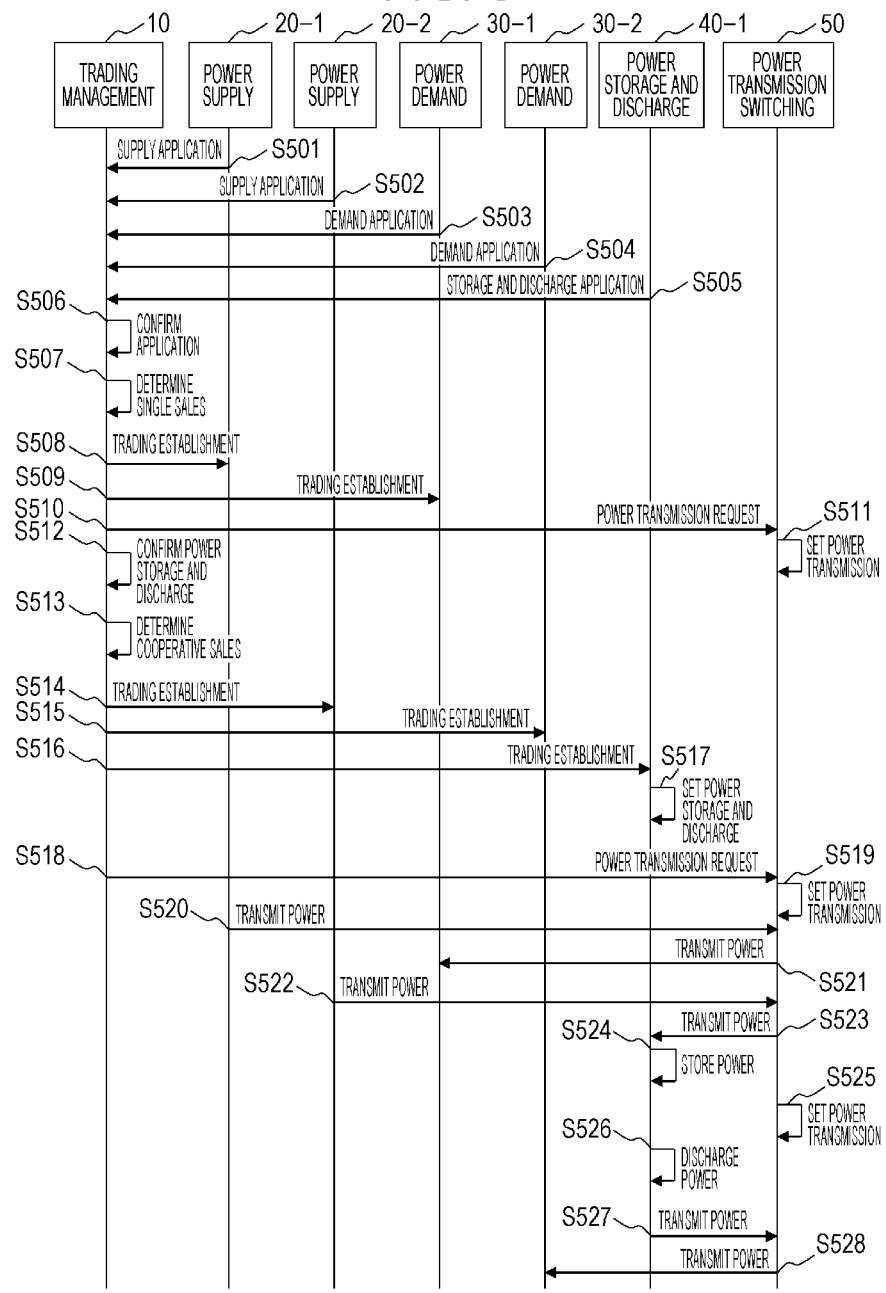

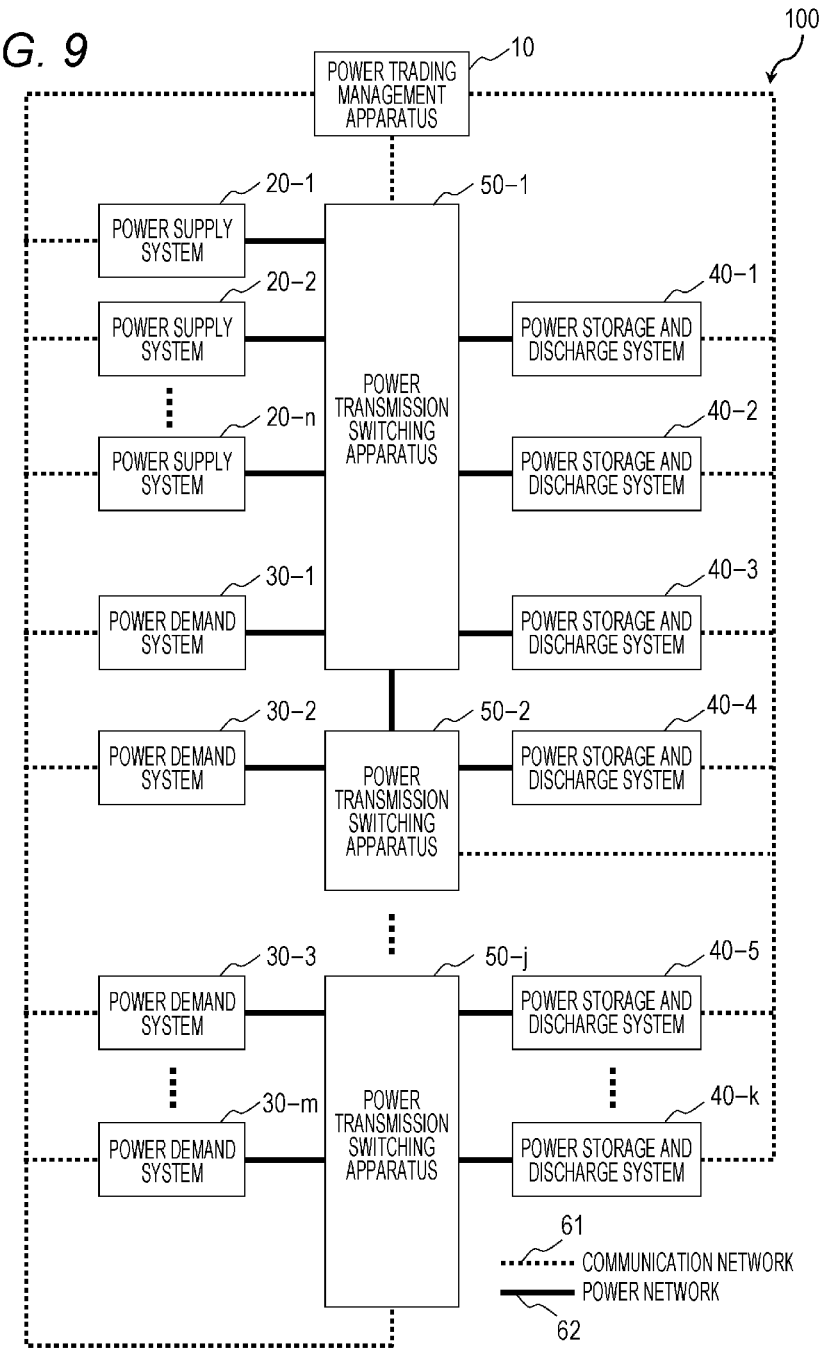

FIG. 14

| TIME ZONE 201 | SUPPLY OPERATOR 202 | STORAGE AND DISCHARGE OPERATOR 203 | DEMAND OPERATOR 204 | TRADING ID 205 |
|---|---|---|---|---|
| 10:00 - 10:59 | | | | |
| 11:00 - 11:59 | | | | |
| 12:00 - 12:59 | 20-2, LOCATION R, 0.1[MW], 0.1[MWh], 10,000 YEN | MOVING EV STORAGE, LOCATION Y, 0.1[MW], 0.1[MWh], 1,000 YEN  (121, A) | | T4-1 |
| 13:00 - 13:59 | | | | |
| 14:00 - 14:59 | | MOVING EV DISCHARGE, LOCATION Z, 0.1[MW], 0.1[MWh], 1,000 YEN  (122, A) | 30-2, LOCATION Z, 0.1[MW], 0.1[MWh], 10,000 YEN | T4-2 |

1400 ↗   231 (row 12:00-12:59)   232 (row 14:00-14:59)

FIG. 17

| | TIME ZONE 201 | SUPPLY OPERATOR 202 | STORAGE AND DISCHARGE OPERATOR 203 | DEMAND OPERATOR 204 | TRADING ID 205 |
|---|---|---|---|---|---|
| 241 | 10:00 - 10:59 | 20-1, 1.5[MW], 1.5[MWh], 15,000 YEN (A) | | | T5-1 |
| 242 | 11:00 - 11:59 | 20-2, 1.5[MW], 1.5[MWh], 15,000 YEN (B) | | (C) | T5-2 |
| 243 | 12:00 - 12:59 | | POWER STORAGE AND DISCHARGE, 40-1, 2[MW], 3[MWh], 3,000 YEN | 30-1, 1[MW], 1[MWh], 10,000 YEN | T5-3 |
| 244 | 13:00 - 13:59 | | | 30-2, 2[MW], 2[MWh], 20,000 YEN (D) | T5-4 |

| TIME ZONE | SUPPLY OPERATOR | STORAGE AND DISCHARGE OPERATOR | DEMAND OPERATOR | TRADING ID |
|---|---|---|---|---|
| 10:00 - 10:59 | 20-1, 2[MW], 2[MWh], 20,000 YEN | POWER CHARGE AND DISCHARGE, 40-1, 2[MW], 2[MWh], 2,000 YEN | | T6-1 |
| 11:00 - 11:59 | | | 30-1, 1[MW], 1[MWh], 10,000 YEN | T6-2 |

| | |
|---|---|
| TRADING ID | T2-1 |
| TRADING RESULT | ESTABLISHMENT |
| TRADING FORM | SUPPLY |
| TARGET APPARATUS ID | 20-2 |
| POWER | 1[MW] |
| AMOUNT OF POWER | 1[MWh] |
| POWER TRANSMISSION PERIOD | OCTOBER 1  12:00 – 12:59 |
| POWER TRADING PRICE | +10,000 YEN |
| CHARGE AND DISCHARGE USAGE AND NONUSAGE | USAGE |
| CHARGE AND DISCHARGE USAGE PRICE | –1,000 YEN |

| | |
|---|---|
| TRADING ID | T2-2 |
| TRADING RESULT | ESTABLISHMENT |
| TRADING FORM | DEMAND |
| TARGET APPARATUS ID | 30-2 |
| POWER | 1[MW] |
| AMOUNT OF POWER | 1[MWh] |
| POWER TRANSMISSION PERIOD | OCTOBER 1  13:00 – 13:59 |
| POWER TRADING PRICE | –10,000 YEN |
| CHARGE AND DISCHARGE USAGE AND NONUSAGE | USAGE |
| CHARGE AND DISCHARGE USAGE PRICE | –1,000 YEN |

POWER TRADING MANAGEMENT APPARATUS AND POWER TRADING SYSTEM

CLAIM OF PRIORITY

The present application claims priority from Japanese patent application JP 2020-12190 filed on Jan. 29, 2020, the content of which is hereby incorporated by reference into this application.

BACKGROUND OF THE INVENTION

1. Field of the Invention

The present invention relates to a power trading management apparatus and a power trading system.

2. Description of the Related Art

In recent years, the use of renewable energy such as photovoltaic power generation is increased. A sales trading for the generated power is performed. In this sales trading, the trading is established when conditions match each other based on the amount of sales power and a time.

As a background art of this field, there is a technology described in JP 2017-153274 A. JP 2017-153274 A describes that "an object is to provide a power trading matching system, a power trading matching method, and a power trading matching program capable of efficiently exchanging surplus power among a plurality of consumers including a power generation apparatus and a storage battery. As solving means thereof, a power trading matching system 10 includes a required power amount information acquisition unit 11, a consumer information acquisition unit 12, a surplus power estimation unit 14, and a matching unit 15. the surplus power estimation unit 14 estimates the amount of surplus power capable of being supplied based on the amount of generated power, the amount of stored power, and the amount of consumed power in a predetermined time zone of a consumer B30 acquired by the consumer information acquisition unit 12. the matching unit 15 detects a combination of the consumers in which conditions match each other by collating information of the amount of surplus power capable of being supplied from the consumer B30 estimated by the surplus power estimation unit 14 with required power amount information of a consumer A20 acquired by the required power amount information acquisition unit 11".

SUMMARY OF THE INVENTION

However, in the above-described technology, it is necessary to match the conditions by collating a condition for the power capable of being supplied with a condition for the required power as the conditions for the power trading, and thus, there is a problem that the trading is not established when the conditions do not match each other. Thus, there is a problem that power is wasted on a supply side and power cannot be used on a demand side.

An object of the present invention is to enable a flexible power trading even when a condition on a side that provides power and a condition on a side that requires power are different.

An aspect of the present invention disclosed in the present application provides a power trading management apparatus in which a power supply apparatus which supplies power, a power demand apparatus which requests power, a power storage and discharge apparatus which stores and discharges power, and a power transmission switching apparatus which switches a power transmission path between the power supply apparatus, the power demand apparatus, and the power storage and discharge apparatus are connected via a power network, and that is connected so as to be able to communicate with a supply-side computer which controls the power supply apparatus, a demand-side computer which controls the power demand apparatus, and the power transmission switching apparatus via a communication network. The power trading management apparatus includes a processor that executes a program, and a storage device that stores the program. The processor executes reception processing of receiving power supply application data including the amount of supplied power and a supply period from the supply-side computer, and receiving power demand application data including the amount of requested power and a request period from the demand-side computer, determination processing of determining whether or not a first trading condition in which the supply period is a period earlier than the request period is satisfied, decision processing of deciding the amount of transmitted power for the power demand apparatus based on at least any one amount of power of the amount of supplied power and the amount of requested power when the first trading condition is satisfied by the determination processing, and power transmission control processing of storing the amount of supplied power in the power storage and discharge apparatus from the power supply apparatus in the supply period and discharging the amount of transmitted power decided by the decision processing to the power demand apparatus from the power storage and discharge apparatus in the request period by controlling the power transmission switching apparatus.

According to a representative embodiment of the present invention, it is possible to perform a flexible power trading even when a condition on a side that provides power and a condition on a side that requires power are different. Other objects, configurations, and effects will be made apparent in the following embodiments.

BRIEF DESCRIPTION OF THE DRAWINGS

FIG. 2 is an explanatory diagram illustrating an example of power trading management data in the first embodiment;

FIG. 3A is an explanatory diagram illustrating an example of power supply list data managed by a power trading management apparatus in the first embodiment;

FIG. 3B is an explanatory diagram illustrating an example of power demand list data managed by the power trading management apparatus in the first embodiment;

FIG. 3C is an explanatory diagram illustrating an example of storage and discharge available list data managed by the power trading management apparatus in the first embodiment;

FIG. 4A1 is an explanatory diagram illustrating Example 1 of power supply application data transmitted by a supply-side computer to the power trading management apparatus in the first embodiment;

FIG. 4A2 is an explanatory diagram illustrating Example 2 of the power supply application data transmitted by the supply-side computer to the power trading management apparatus in the first embodiment;

FIG. 4B1 is an explanatory diagram illustrating Example 1 of power demand application data transmitted by a demand-side computer to the power trading management apparatus in the first embodiment;

FIG. 4B2 is an explanatory diagram illustrating Example 2 of the power demand application data transmitted by the demand-side computer to the power trading management apparatus in the first embodiment;

FIG. 4C is an explanatory diagram illustrating an example of power storage and discharge application data transmitted by a power-storage-and-discharge-side computer to the power trading management apparatus in the first embodiment;

FIG. 5 is a sequence diagram illustrating an example of a power trading sequence in the first embodiment;

FIG. 9 is a block diagram illustrating a system configuration example of a power trading system according to a second embodiment;

FIG. 14 is an explanatory diagram illustrating an example of power trading management data in the third embodiment;

FIG. 17 is an explanatory diagram illustrating an example of power trading management data in a fourth embodiment;

FIG. 18 is an explanatory diagram illustrating an example of power trading management data in a fifth embodiment;

FIG. 19A is an explanatory diagram illustrating an example of power trading establishment presentation data for power supply in a sixth embodiment;

FIG. 19B is an explanatory diagram illustrating an example of power trading establishment presentation data for a power demand application in the sixth embodiment;

DESCRIPTION OF THE PREFERRED EMBODIMENTS

Figure 1:
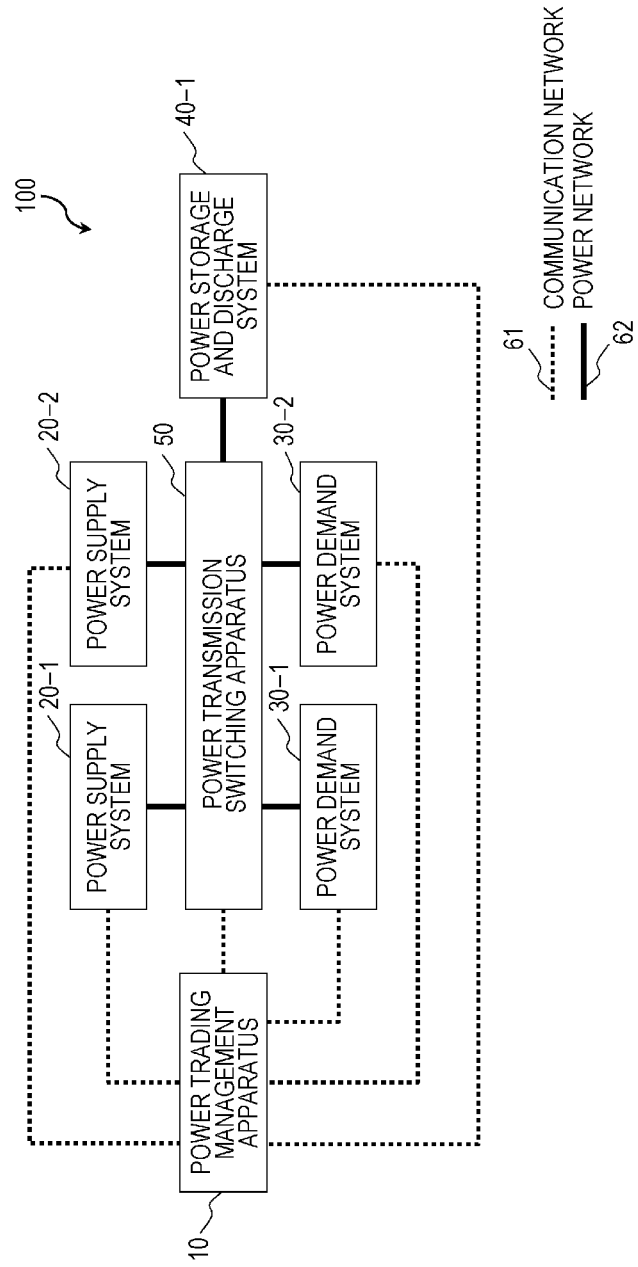
FIG. 1 is a block diagram illustrating a system configuration example of a power trading system according to a first embodiment.

Embodiments for carrying out the invention will be described in detail with reference to the drawings. However, the present invention is not interpreted as being limited to the description contents of the embodiments to be illustrated below. It is easily understood by those skilled in the art that the specific configuration can be changed without departing from the idea or the spirit of the present invention. Positions, sizes, shapes, and ranges of components illustrated in the drawings may not necessarily represent actual positions, sizes, shapes, and ranges in order to facilitate understanding of the invention. Thus, the present invention is not necessarily limited to the positions, sizes, shapes, and ranges disclosed in the drawings.

Hereinafter, first to sixth embodiments of the present invention will be described with reference to FIGS. 1 to 19D. In the first to sixth embodiments, when a condition on a power supply side and a condition on a power demand side are different and when a power transmission side can absorb a difference between the conditions, the power supply and demand trading is established.

First Embodiment

In the first embodiment, in a situation in which a time during which power is supplied and a time during which the power is required are different, when the power transmission side can absorb a time condition by a power storage and discharge system, an operation of establishing the power supply and demand trading will be described. Hereinafter, an operation of power trading management according to the first embodiment will be described with reference to FIGS. 1 to 8B.

System Configuration

FIG. 1 is a block diagram illustrating a system configuration example of a power trading system according to the first embodiment. As illustrated in FIG. 1, a power trading system 100 according to the first embodiment includes a power trading management apparatus 10, power supply systems 20-1 and 20-2 that supply power, power demand systems 30-1 and 30-2 that request and consume power, a power storage and discharge system 40-1, power transmission switching apparatus 50 that controls transmission of power, a communication network 61 that transmits and receives communication data between the apparatuses, and a power network 62 that transmits and receives power between the apparatuses.

That is, the power trading management apparatus 10 is connected to be able to communicate with the power supply systems 20, the power demand systems 30, the power storage and discharge system 40, and the power transmission switching apparatus 50 that switches a power transmission path between the power supply systems 20, the power demand systems 30, the power storage and discharge system 40 via the communication network 61.

In the following description, a common part of reference signs excluding branch numbers may be used when the same kind of elements are described without being distinguished, and reference signs including the branch numbers may be used when the same kind of elements are described by being distinguished.

For example, when the power supply systems 20-1 and 20-2 are described without being particularly distinguished, the power supply systems may be referred to as the "power supply systems 20", and when the individual power supply systems are described by being distinguished, the power supply systems may be referred to as the "power supply system 20-1" and the "power supply system 20-2". The reference sign may be used as identification information (ID) of the apparatus to which the reference sign is assigned.

The power supply system 20 includes, for example, a power supply apparatus such as a photovoltaic power generator and a supply-side computer that controls the power supply apparatus. The supply-side computer accesses the power trading management apparatus 10 via the communication network 61, and gives notification of power capable of being supplied, the amount of power, a time zone, a desired supply price, and the like. The contents of the notification are described later with reference to FIGS. 4A1 and 4A2 (hereinafter, collectively referred to as FIG. 4A. The same applies to other drawing numbers.). The power supply apparatus is connected to the power transmission switching apparatus 50 by the power network 62. For the sake of convenience in description, the power supply apparatus and the supply-side computer are also assigned by the same reference signs as those of the power supply system 20.

The power demand system 30 includes, for example, a power demand apparatus that consumes power such as an air conditioner, a lighting device, and a machine tool, and a demand-side computer that controls the power demand apparatus. The demand-side computer accesses the power trading management apparatus 10 via the communication network 61, and gives notification of power to be consumed, the amount of power, a time zone, a desired demand price, and the like. The contents of the notification will be described later with reference to FIG. 4B. The power demand apparatus is connected to the power transmission switching apparatus 50 via the power network 62. For the sake of convenience in description, the power demand apparatus and the demand-side computer are also assigned by the same reference signs as those of the power demand system 30.

The power storage and discharge system 40 includes a power storage and discharge apparatus that stores and discharges power, and a power-storage-and-discharge-side computer that controls the power storage and discharge apparatus. The power-storage-and-discharge-side computer accesses the power trading management apparatus 10 via the communication network 61, and gives notification of power capable of being stored and discharged, the amount of power, a time zone, a desired storage and discharge price, and the like. The amount of power capable of being stored and discharged in the power storage and discharge apparatus is the amount obtained by subtracting the amount of current storage power from the amount of maximal storage power in the power storage and discharge apparatus. When the power storage and discharge apparatus applies for the amount of stored power to the power trading management apparatus 10, the amount of stored power required for the application is equal to or less than the amount of power capable of being stored in the power storage and discharge apparatus. The contents of the notification will be described later with reference to FIG. 4C. The power storage and discharge apparatus is connected to the power transmission switching apparatus 50 via the power network 62. For the sake of convenience in description, the power storage and discharge apparatus and the power-storage-and-discharge-side computer are also assigned by the same references as those of the power storage and discharge system 40.

The power transmission switching apparatus 50 is connected to the power supply apparatus 20, the power demand apparatus 30, and the power storage and discharge apparatus 40 via the power network 62. The power transmission switching apparatus 50 is connected to the power trading management apparatus 10 via the communication network 61. The power transmission switching apparatus 50 switches a power transmission path from a power transmission source (for example, the power supply apparatus 20 or the power storage and discharge apparatus 40) to a power transmission destination (for example, the power demand apparatus 30 or the power storage and discharge apparatus 40) under the control from the power trading management apparatus 10.

The power trading management apparatus 10 matches a power trading based on the amount of applied power capable of being supplied, the amount of demand power to be consumed, and the amount of power capable of being stored and discharged. The matching of the power trading includes determination processing of determining whether or not the following first trading condition is satisfied and decision processing of deciding the amount of transmitted power to be discharged from the power storage and discharge apparatus 40 to the power demand apparatus 30 when it is determined that the first trading condition is satisfied.

First trading condition: a trading condition in which a supply period is earlier than a request period.

However, when priority is given to power storage and discharge, the first trading condition is as follows.

First trading condition (priority is given to power storage and discharge): a trading condition regarding a trading period in which a storage period in a storage and discharge application includes a supply period in a power supply application, a discharge period in the storage and discharge application includes a request period in a power demand application, and the supply period is earlier than the request period.

When priority is given to the power storage and discharge, the above-mentioned determination processing is to determine whether or not the first trading condition (priority is given to the power storage and discharge) and the following second trading condition are satisfied. A case where priority is given to the power storage and discharge is a case where an application from the power-storage-and-discharge-side computer 40 takes priority over applications from the supply-side computer 20 and the demand-side computer 30 or a case where the amount of power capable of being stored in the power storage and discharge apparatus 40 described above is restricted.

Second trading condition: a trading condition enabling power transmission relaying due to the power storage and discharge in the power storage and discharge apparatus 40 in which the power storage and discharge apparatus 40 can store the amount of supplied power from the power supply apparatus 20 and can discharge the amount of requested power to the power demand apparatus 30.

In the first embodiment, the second trading condition is, for example, as follows.

The amount of supplied power in the power supply application and the amount of stored power in the storage application match each other, and the amount of requested power in the power demand application and the amount of discharged power in the discharge application match each other.

When it is determined that the first trading condition is satisfied (in the case of the first trading condition (priority is given to the power storage and discharge), the first trading condition (priority is given to the power storage and discharge) and the second trading condition are satisfied. The same applies later.), the power trading management apparatus 10 decides the amount of requested power as the amount of transmitted power in the decision processing. The power trading management apparatus 10 may decide, as the amount of transmitted power, the smaller amount of power of the amount of supplied power and the amount of requested power in the decision processing.

The matching of the power trading may include the following third trading condition.

Third trading condition: a trading condition regarding a price in which a supply price of the amount of supplied power and a request price of the amount of requested power match each other.

In a case where the third trading condition is also applied, when it is determined that the first trading condition to the third trading condition are satisfied, the power trading management apparatus 10 decides the amount of requested power as the amount of transmitted power in the decision processing. The power trading management apparatus 10 may decide, as the amount of transmitted power, the smaller amount of power of the amount of supplied power and the amount of requested power in the decision processing.

Thereafter, the power trading management apparatus 10 notifies the related supply-side computer 20, demand-side computer 30, power-storage-and-discharge-side computer 40-1, and power transmission switching apparatus 50 that the applied tradings are established via the communication network 61 based on the established power trading. The power trading management apparatus 10 sets the power transmission switching apparatus 50 such that power can be transmitted and received based on the established power trading.

Power Trading Management Data

FIG. 2 is an explanatory diagram illustrating an example of power trading management data in the first embodiment. Power trading management data 200 includes fields of a time zone 201, supply operator relevant information 202, power storage and discharge operator relevant information 203, demand operator relevant information 204, and established trading ID 205.

The supply operator relevant information 202 is information related to a supply operator. The supply operator is an operator that supplies power. The supply operator relevant information 202 includes, for example, data such as an apparatus ID (20) of the power supply apparatus 20, supplied power (1 [MW]), the amount of supplied power (1 [MWh]), and a desired supply price (10,000 yen).

The demand operator relevant information 204 is information related to a demand operator. The demand operator is an operator that requests power. The demand operator relevant information 204 includes, for example, data such as an apparatus ID (30) of the power demand apparatus 30, demanded power (1 [MW]), the amount of demanded power (1 [MWh]), and a desired demand price (10,000 yen).

The storage and discharge operator relevant information 203 is information related to a storage and discharge operator. The storage and discharge operator is an operator that stores and discharges power. The storage and discharge operator relevant information 203 includes data such as an apparatus ID (40) of the power storage and discharge apparatus 40, stored and discharged power (1 [MW]), the amount of stored and discharged power (1 [MWh]), and a desired storage and discharge price (2,000 yen).

In a time zone (from 10:00 to 10:59) represented in a row 211, the supply operator relevant information 202 based on an application from the supply operator, the demand operator relevant information 204 based on an application from the demand operator, and the established trading ID 205 are recorded. Specifically, data such as the apparatus ID of "20-1", the supplied power of "1 [MW]", the amount of supplied power of "1 [MWh]", and the desired supply price of "10,000 yen" is recorded as the supply operator relevant information 202 based on an application from a supply operator A. Data such as the apparatus ID of "30-1", the demanded power of "1 [MW]", the amount of demanded power of "1 [MWh]", and the desired demand price of "10,000 yen" is recorded as the demand operator relevant information 204 based on an application from a demand operator C.

Thus, as represented in a frame 101, in a time zone 201 (from 10:00 to 10:59) of the row 211, a power supply condition (power, the amount of power, time zone, and price) and a power demand condition (power, the amount of power, time zone, and price) match each other, and "T1" is recorded in the trading ID 205 of the established trading. As stated above, the trading ID 205 is registered only when the trading is established.

In the time zone 201 (from 11:00 to 11:59) represented in a row 212, a situation in which there are no applications from the supply operator or the demand operator.

In the time zone 201 (from 12:00 to 12:59) represented in a row 213, data such as the apparatus ID of "20-2", the supplied power of "1 [MW]", the amount of supplied power of "1 [MWh]", and the desired supply price of "10,000 yen" is recorded as the supply operator relevant information 202 based on an application from a supply operator B. However, in this time zone 201, application information from the demand operator is not recorded, and the trading is not established as a single time zone.

In the time zone (from 13:00 to 13:59) represented in a row 214, data such as the apparatus ID of "30-2", the demanded power of "1 [MW]", the amount of demanded power of "1 [MWh]", and the desired demand price of "10,000 yen" is recorded as the demand operator relevant information 204 based on an application from a demand operator D. However, in this time zone 201, the supply operator relevant information 202 based on the application from the supply operator is not recorded, and the trading is not established as the single time zone 201.

Meanwhile, in the time zone 201 (from 12:00 to 13:59) that spans the rows 213 and 214, data such as the apparatus ID of "40-1", the stored and discharged power of "1 [MW]", the amount of stored and discharged power of "1 [MWh]", and the desired storage and discharge price of "2,000 yen" is recorded as the storage and discharge operator relevant information 203 based on an application from a storage and discharge operator E. Here, when the power supply condition of the power supply apparatus 20-2 in the time zone 201 (from 12:00 to 12:59) in the row 213 and the power demand condition in the time zone 201 (from 13:00 to 13:59) in the row 214 are compared, the power and the amount of power of the supply and demand are equal to each other, but a time difference between the supply and demand is one hour. Accordingly, a frame 102 satisfies the above-mentioned first trading condition in the matching of the power trading.

Meanwhile, when these conditions including a power storage and discharge condition are compared, the power trading management apparatus 10 determines that power can be supplied to the power demand apparatus 30 by storing the amount of power supplied from the power supply apparatus 20 and discharging the amount of stored power by the power storage and discharge apparatus 40-1. That is, the frame 102 satisfies the above-mentioned second trading condition in the matching of the power trading.

Thus, as represented in the frame 102, the power can be supplied to the power demand apparatus 30-2 by storing the amount of power supplied from the power supply apparatus 20-2 in the power storage and discharge apparatus 40-1 in the time zone 201 (from 12:00 to 12:59) of the row 213 and discharging the amount of power stored in the power storage and discharge apparatus 40-1 in the time zone 201 (from 13:00 to 13:59) of the row 214. "T2-1" and "T2-2" are recorded in the trading ID 205 of the established trading.

Although the trading of the power has been described with the time zone 201 as a base axis in the first embodiment that for the sake of convenience in description, the base axis may be limited to the time zone 201 such as date, hour, minute, second, or day of the week, and the power trading may be performed with date, hour, minute, second, day of the week, or the like as the base axis.

List Data

FIG. 3A is an explanatory diagram illustrating an example of power supply list data managed by the power trading management apparatus 10 in the first embodiment. FIG. 3B is an explanatory diagram illustrating an example of power demand list data managed by the power trading management apparatus 10 in the first embodiment. FIG. 3C is an explanatory diagram illustrating an example of storage and discharge available list data managed by the power trading management apparatus 10 in the first embodiment.

Power supply list data 310 is data that lists power supply information. Power demand list data 320 is data that lists power demand information. Storage and discharge available list data 330 is data that lists power storage and discharge available information.

Each of the power supply list data 310, the power demand list data 320, and the storage and discharge available list data 330 includes fields of a management ID 301, a trading type 302, a time zone 303, power 304, the amount of power 305, a price 306, and an apparatus ID 307. A combination of values of the fields in the same row constitutes one management unit.

The management ID 301 is identification information that specifies a management unit. The trading type 302 indicates a type of the trading. In the trading type 302, for example, "supply" is recorded in the power supply list data 310, "demand" is recorded in the power supply list data 310, and "power storage and discharge" is recorded in the storage and discharge available list data 330.

The time zone 303 is a time interval from a start time to an end time of the trading of the trading type 302. The power 304 indicates the amount of power to be traded in the trading type 302. The price 306 is the amount of money of the power 304 to be traded in the trading type 302. The apparatus ID 307 is identification information of the apparatus that executes the trading of the trading type 302. In the case of the power supply list data 310, the apparatus ID is the apparatus ID of the power supply apparatus 20, in the case of the power demand list data 320, the apparatus ID is the apparatus ID of the power demand apparatus 30, and in the case of the storage and discharge available list data 330, the apparatus ID is the apparatus ID of the power storage and discharge apparatus 40.

In FIG. 3A, in the example of the power supply information represented in a row 311, the management ID 301 is "S1", the trading type 302 is "supply", the time zone 303 is "from 10:00 to 10:59", the power 304 is "1 [MW]", the amount of power 305 is "1 [MWh]", the price 306 is "10,000 yen", and the apparatus ID 307 is 20-1.

In FIG. 3A, in the example of the power supply information represented in a row 312, the management ID 301 is "S2", the trading type 302 is "supply", the time zone 303 is "from 12:00 to 12:59", the power 304 is "1 [MW]", the amount of power 305 is "1 [MWh]", the price 306 is "10,000 yen", and the apparatus ID 307 is "20-2".

In FIG. 3B, in the example of the power demand information represented in a row 321, the management ID 301 is "D1", the trading type 302 is "demand", the time zone 303 that requires power is "from 10:00 to 10:59", the power 304 required is "1 [MW]", the amount of power 305 is "1 [MWh]", the price 306 desired is "10,000 yen", and the apparatus ID 307 is "30-1".

In FIG. 3B, in the example of the power demand information represented in a row 322, the management ID 301 is "D2", the trading type 302 is "demand", the time zone 303 is "from 13:00 to 13:59", the power 304 is "1 [MW]", the amount of power 305 is "1 [MWh]", the price 306 is "10,000 yen", and the apparatus ID 307 is "30-2".

In FIG. 3C, in the example of the power storage and discharge available information represented in a row 331, the management ID 301 is "K1", the trading type 302 is "power storage and discharge", the time zone 303 is "from 12:00 to 13:59", the power 304 is "1 [MW]", the amount of power 305 is "1 [MWh]", the price 306 is "2,000 yen", and the apparatus ID 307 is "40-1".

The power trading management apparatus 10 generates the power trading management data 200 illustrated in FIG. 2 from the list data 310, 320, and 330 illustrated in FIGS. 3A, 3B, and 3C.

Power Supply Application Data

FIG. 4A1 is an explanatory diagram illustrating Example 1 of power supply application data transmitted by the supply-side computer 20-1 to the power trading management apparatus 10 in the first embodiment. FIG. 4A2 is an explanatory diagram illustrating Example 2 of power supply application data transmitted by the supply-side computer 20-2 to the power trading management apparatus 10 in the first embodiment. FIG. 4B1 is an explanatory diagram illustrating Example 1 of power demand application data transmitted by the demand-side computer 30-1 to the power trading management apparatus 10 in the first embodiment. FIG. 4B2 is an explanatory diagram illustrating Example 2 of power demand application data transmitted by the demand-side computer 30-2 to the power trading management apparatus 10 in the first embodiment. FIG. 4C is an explanatory diagram illustrating an example of storage and discharge application data transmitted by the power-storage-and-discharge-side computer 40-1 to the power trading management apparatus 10 in the first embodiment.

Each of power supply application data 4A1, power supply application data 4A2, power demand application data 4B1, power demand application data 4B2, and storage and discharge application data 4C includes fields of a processing type 401, a trading type 402, a time zone 403, power 404, the amount of power 405, a price 406, and an apparatus ID 407. A combination of values of the fields in the same row constitutes one management unit.

The processing type 401 indicates a type in which the row is processed. In the case of "application", the processing type is data for applying with the content of the row, in the case of "cancellation", the processing type is data for canceling the content of the row applied before the cancellation, and in the case of "change", the processing type is data for changing the content of the row applied before the change. In all FIGS. 4A1, 4A2, 4B1, 4B2, and 4C, since the processing type is "application", the power supply application data 4A1, the power supply application data 4A2, the power demand application data 4B1, the power demand application data 4B2, and the storage and discharge application data 4C are illustrated.

The trading type 402 indicates a type of the trading to be processed in the processing type. The time zone 403 is a time interval from a start time to an end time of the processing in the processing type 401 for the trading of the trading type 402. The power 404 indicates a value of the power to be processed in the processing type 401 for the trading of the trading type 402. The amount of power 405 indicates the amount of power to be processed in the processing type 401 for the trading of the trading type 402. The price 406 is the amount of money of the amount of power 405 to be processed in the processing type 401 for the trading of the trading type 402. The apparatus ID 407 is identification information of the apparatus that executes the processing in the processing type 401 for the trading of the trading type 402.

In FIG. 4A1, in an example represented in a row 411, the processing type 401 is "application", the trading type 402 is "supply", the time zone 403 is "from 10:00 to 10:59", the power 404 is "1 [MW]", the amount of power 405 is "1 [MWh]", the price 406 is "10,000 yen", and the apparatus ID 407 is "20-1".

In FIG. 4A2, in an example represented in a row 412, the processing type 401 is "application", the trading type 402 is "supply", the time zone 403 is "from 12:00 to 12:59", the power 404 is "1 [MW]", the amount of power 405 is "1 [MWh]", the price 406 is "10,000 yen", and the apparatus ID 407 is "20-2".

In FIG. 4B1, in an example represented in a row 421, the processing type 401 is "application", the trading type 402 is "demand", the time zone 403 is "from 10:00 to 10:59", the power 404 is "1 [MW]", the amount of power 405 is "1 [MWh]", the price 406 desired is "10,000 yen", and the apparatus ID 407 is "30-1".

In FIG. 4B2, in an example represented in a row 422, the processing type 401 is "application", the trading type 402 is "demand", the time zone 403 is "from 13:00 to 13:59", the power 404 is "1 [MW]", the amount of power 405 is "1 [MWh]", the price 406 is "10,000 yen", and the apparatus ID 407 is "30-2".

In FIG. 4C, in an example represented in a row 431, the processing type 401 is "application", the trading type 402 is "power storage and discharge", the time zone 403 is "from 12:00 to 13:59", the power 404 is "1 [MW]", the amount of power 405 is "1 [MWh]", the price 406 is "2,000 yen", and the apparatus ID 407 is "40-1".

When the power supply application data 4A1, the power supply application data 4A2, the power demand application data 4B1, the power demand application data 4B2, and the storage and discharge application data 4C are not distinguished, these data are simply referred to as "application data".

Power Trading Sequence

FIG. 5 is a sequence diagram illustrating an example of a power trading sequence in the first embodiment. The supply-side computer 20-1 transmits, as a supply application for selling power, the power supply application data 4A1 described with reference to FIG. 4A1 to the power trading management apparatus 10 (step S501).

The supply-side computer 20-2 transmits, as a supply application for selling power, the power supply application data 4A2 described with reference to FIG. 4A2 to the power trading management apparatus 10 (step S502).

The demand-side computer 30-1 transmits, as a demand application for purchasing power, the power demand application data 4B1 described with reference to FIG. 4B1 to the power trading management apparatus 10 (step S503).

The demand-side computer 30-2 transmits, as a demand application for purchasing power, the power demand application data 4B2 described with reference to FIG. 4B2 to the power trading management apparatus 10 (step S504).

The power-storage-and-discharge-side computer 40-1 transmits, as a storage and discharge application capable of storing and discharging power, the storage and discharge application data 4C described with reference to FIG. 4C to the power trading management apparatus 10 (step S505).

In other words, the power trading management apparatus 10 executes reception processing of receiving the application data in steps S501 to S505.

The power trading management apparatus 10 confirms whether or not there are the applications for the supply, the demand, and the storage and discharge of the power from all the apparatuses 10, 20, 30, and 40 (step S506).

When there are the applications for the supply and the demand of the power, the power trading management apparatus 10 determines whether or not the power trading is established for each time zone 403 (for example, from 10:00 to 10:59), and registers the trading establishment when the trading is established (step S507).

When there is the matching between the supply and demand of the power, the power trading management apparatus 10 notifies the supply-side computer 20 that the trading is established. In this example, an example in which the power trading management apparatus 10 notifies the supply-side computer 20-1 that the trading is established is illustrated (step S508).

Specifically, for example, the power trading management apparatus 10 notifies the supply-side computer 20-1 that the trading is established at 10,000 yen represented in the power supply application data 4A1 as the price 406 of the power supply. The price 406 of the power supply is the amount of money received by the supply operator of the power from the demand operator. Here, the supply operator may pay a part of the supply price to the operator that provides the power trading system 100.

When there is the matching between the supply and demand of the power, the power trading management apparatus 10 notifies the demand-side computer 30 that the trading is established. In this example, an example in which the power trading management apparatus 10 notifies the demand-side computer 30-1 that the trading is established is illustrated (step S509).

Specifically, for example, the power trading management apparatus 10 notifies the demand-side computer 30-1 that the trading is established at 10,000 yen represented in the power demand application data 4B1 as the price 406 of the power demand. The price 406 of the power demand is the amount of money paid by the demand operator of the power to the supply operator. Here, the demand operator may pay a part of the demand price to the operator that provides the power trading system 100.

When there is the matching between the supply and demand of the power, the power trading management apparatus 10 transmits a power transmission request to the power transmission switching apparatus 50 such that the power can be transmitted from the supply-side computer 20-1 to the demand-side computer 30-1 (step S510).

The power transmission switching apparatus 50 executes the setting of the power transmission according to the power transmission request received from the power trading management apparatus 10 (step S511).

When there are the applications for the supply and demand of the power for which the trading is not established only by the combination of the supply application and the demand application of the power, the power trading management apparatus 10 confirms whether or not there is the storage and discharge application of the power (step S512).

When there is the storage and discharge application of the power, the power trading management apparatus 10 determines whether or not the power trading is established by executing the determination processing and the decision processing for the combination of the supply application, the demand application, and the storage and discharge application of the power by using the power trading management data 200 (step S513).

When the power trading is established by combining the supply application, the demand application, and the storage and discharge application of the power, the power trading management apparatus 10 notifies the supply-side computer 20-2 that the power trading including the storage and discharge is established (step S514).

Specifically, for example, the power trading management apparatus 10 notifies the supply-side computer 20-2 that the trading is established at "10,000 yen" as the price 406 of the power supply and "1,000 yen" as the price 406 of the storage and discharge (assuming that the supply operator and the demand operator halve a storage and discharge application price, half of 2,000 yen).

The price 406 of the power supply is the amount of money received by the supply operator of the power from the demand operator. Here, the supply operator may pay a part of the price 406 of the power supply to the operator that provides the power trading system 100. The supply operator pays the established storage and discharge fee to the storage and discharge operator.

The power trading management apparatus 10 notifies the demand-side computer 30-2 that the power trading including the storage and discharge is established (step S515). Specifically, for example, the power trading management apparatus 10 notifies the demand-side computer 30-2 that the trading is established at 10,000 yen as the price 406 of the power demand and 1,000 yen as the price 406 of the storage and discharge (assuming that the supply operator and the demand operator halve the storage and discharge application price, half of 2,000 yen).

The price 406 of the power demand is the amount of money paid by the demand operator of the power to the supply operator. Here, the demand operator may pay a part of the price 406 of the power demand to the operator that provides the power trading system 100. The demand operator pays the established storage and discharge fee to the storage and discharge operator.

The power trading management apparatus 10 notifies the power-storage-and-discharge-side computer 40-1 that the power trading including the storage and discharge is established (step S516). Specifically, for example, the power trading management apparatus 10 notifies that the trading is established at 2,000 yen as the price 406 of the storage and discharge. The price 406 of the storage and discharge is the amount of money paid by the supply operator and the demand operator of the power. Here, the storage and discharge operator may pay, as a system usage fee, a part of the storage and discharge price to the operator that provides the power trading system 100.

When the power trading establishment is received from the power trading management apparatus 10, the power-storage-and-discharge-side computer 40-1 performs setting such that the storage and discharge of the power is performed the power in the time zone 403 applied (step S517).

When there is the matching for the combination of the supply, the demand, and the storage and discharge of the power, the power trading management apparatus 10 transmits a power transmission request to the power transmission switching apparatus 50 such that the power can be transmitted from the power supply apparatus 20-2 to the power storage and discharge apparatus 40-1 and the power can be transmitted from the power storage and discharge apparatus 40-1 to the power demand apparatus 30-2 (step S518).

The power transmission switching apparatus 50 executes the setting of the power transmission according to the power transmission request received from the power trading management apparatus 10 (step S519).

The power supply apparatus 20-1 supplies the power based on the applied power supply under the control of the supply-side computer 20-1 in the time zone 403 in which the trading is established (step S520).

The power transmission switching apparatus 50 relays the power transmitted from the power supply apparatus 20-1 to the power demand apparatus 30-1 (step S521).

In the time zone 403 in which the trading is established, the power supply apparatus 20-2 supplies the power based on the applied power supply under the control of the supply-side computer 20-2 (step S522).

The power transmission switching apparatus 50 relays the power transmitted from the power supply apparatus 20-2 to the power storage and discharge apparatus 40-1 (step S523).

The power storage and discharge apparatus 40-1 stores the power relayed from the power transmission switching apparatus 50 (step S524).

The power transmission switching apparatus 50 executes setting for relaying the power transmitted from the power storage and discharge apparatus 40-1 to the power demand apparatus 30-2 (step S525).

In the time zone 403 of the discharge in which the trading is established, the power storage and discharge apparatus 40-1 starts discharging the stored power under the control of the power-storage-and-discharge-side computer 40-1 (step S526), and executes the power transmission (step S527).

The power transmission switching apparatus 50 relays the power transmitted from the power storage and discharge apparatus 40-1 to the power demand apparatus 30-2 (step S528).

Hardware Configuration of Computer

Figure 6:
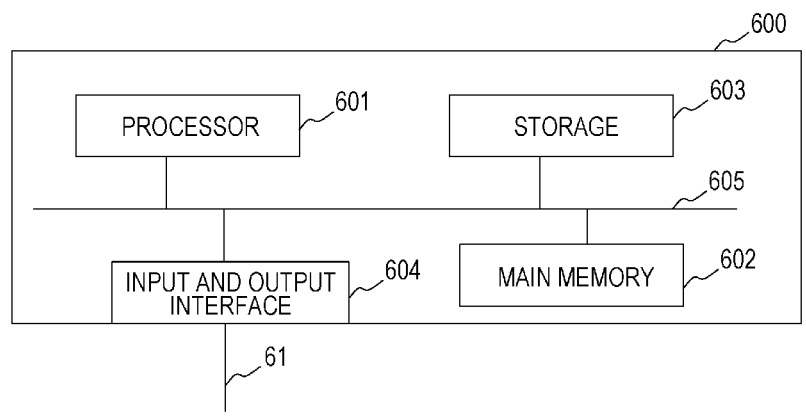
FIG. 6 is a block diagram illustrating a hardware configuration example of a computer in the first embodiment.

FIG. 6 is a block diagram illustrating a hardware configuration example of a computer according to the first embodiment. A computer 600 is a computer included in each of the power trading management apparatus 10, the power supply system 20, the power demand system 30, the power storage and discharge system 40, and the power transmission switching apparatus 50. The computer 600 includes a processor 601, a main memory 602 and a storage 603 as storage devices, and an input and output interface 604 for transmitting and receiving data via the communication network 61, and the respective configurations are connected to each other via a bus 605. The computer may include an input and output device (not illustrated), for example, a keyboard or an image display device.

The processor 601 controls the respective parts of the computer 600, and executes various functions of the computer 600 by loading a program stored in the storage 603 into the main memory 602 and executing the program. The main memory 602 stores a program executed by the processor 601 and work data necessary for executing the program. The storage 603 is a large-capacity storage device such as a solid state drive (SSD) or a hard disk drive (HDD).

Figure 7:
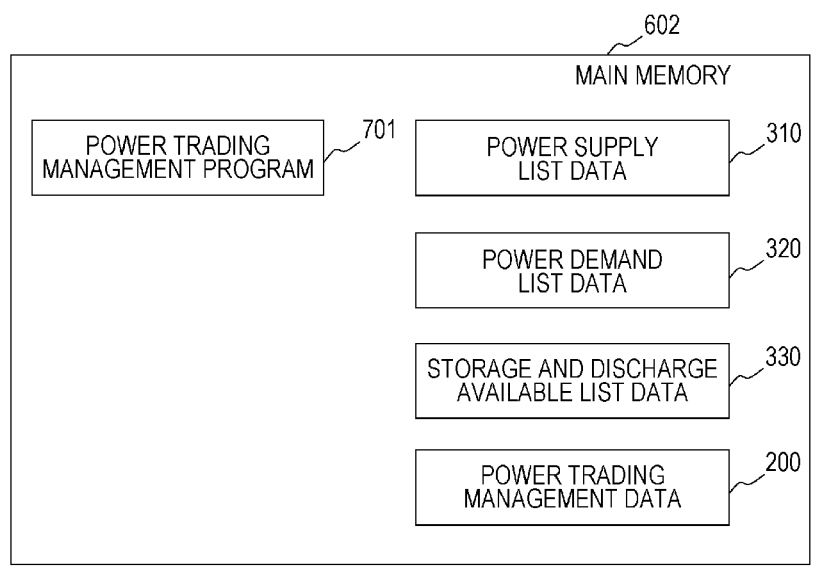
FIG. 7 is an explanatory diagram illustrating an example of data stored in a memory in the power trading management apparatus according to the first embodiment.

FIG. 7 is an explanatory diagram illustrating an example of data stored in the main memory 602 of the computer 600 in the power trading management apparatus 10 in the first embodiment. A power trading management program 701 is loaded and executed in the main memory 602. The power supply list data 310, the power demand list data 320, the storage and discharge available list data 330, and the power trading management data 200 required for executing the program are stored in the main memory. The power supply list data 310 is the data described with reference to FIG. 3A. The power demand list data 320 is the data described with reference to FIG. 3B. The storage and discharge available list data 330 is the data described with reference to FIG. 3C. The power trading management data 200 is the data described with reference to FIG. 2.

Power Trading Management Processing

Figure 8A:
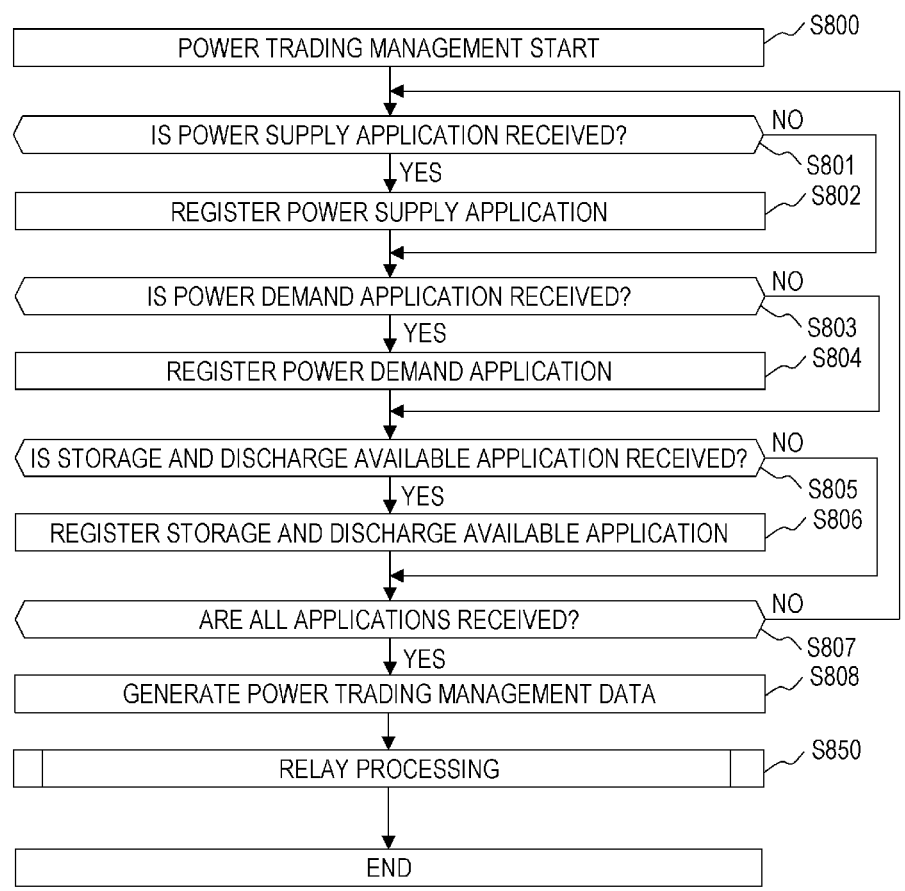
FIG. 8A is a flowchart illustrating a power trading management processing procedure example in the first embodiment.

FIG. 8A is a flowchart illustrating a power trading management processing procedure example in the first embodiment. The processor 601 of the power trading management apparatus 10 loads the power trading management program 701 stored in the storage 603 into the main memory 602 and starts managing the power trading (step S800).

The power trading management apparatus 10 determines whether or not the application for the power supply is received (step S801). In the determination of step S801, when it is determined that the application for the power supply is received (step S801: Yes), the power trading management apparatus 10 registers the application in the power supply list data 310 (step S802). For example, when the power supply application data 4A1 is received, the data in the row 311 is registered in the power supply list data 310 based on the data in the row 411.

In the determination of step S801, when it is determined that the application for the power supply is not received (step S801: No), the power trading management apparatus 10 determines whether or not the application for the power demand is received (step S803).

In the determination of step S803, when it is determined that the application for the power demand is received (step S803: Yes), the power trading management apparatus 10 registers the application in the power demand list data 320 (step S804). For example, when the power demand application data 4B1 is received, the data in the row 321 is registered in the power demand list data 320 based on the data in the row 421.

In the determination of step S803, when it is determined that the application for the power demand is not received (step S803: No), the power trading management apparatus 10 determines whether or not the storage and discharge available application is received (step S805).

In the determination of step S805, when it is determined that the storage and discharge available application is received (step S805: Yes), the power trading management apparatus 10 registers the application in the storage and discharge available list data 330 (step S806). For example, when the power storage and discharge application data 4C is received, the data in the row 331 is registered in the storage and discharge available list data 330 based on the data in the row 431.

In the determination of step S805, when it is determined that the storage and discharge available application is not received (step S805: No), the power trading management apparatus 10 determines whether or not the supply application, the demand application, and the storage and discharge available application of the power are received from the supply-side computer 20, the demand-side computer 30, and the power-storage-and-discharge-side computer 40 (step S807).

In the determination of step S807, when it is determined that all the applications are not received (step S807: No), the power trading management apparatus 10 returns to step S801 and executes the processing.

In the determination of in step S807, when it is determined that all the applications are received (step S807: Yes), the power trading management apparatus 10 generates the power trading management data 200 by using the power supply list data 310, the power demand list data 320, and the storage and discharge available list data 330 (step S808).

The power trading management apparatus 10 executes relay processing (step S850) after executing the step S808, and then ends the processing.

Figure 8B:
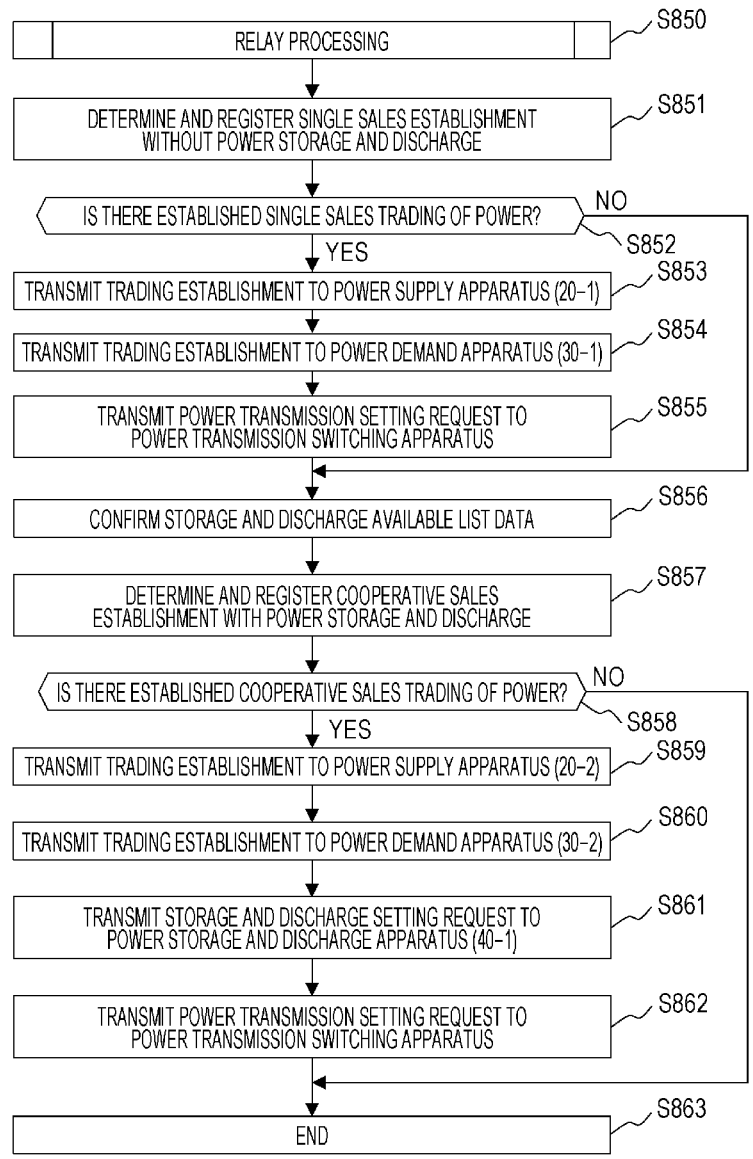
FIG. 8B is a flowchart illustrating a detailed processing procedure example of relay processing (step S850) illustrated in FIG. 8A.

FIG. 8B is a flowchart illustrating a detailed processing procedure example of the relay processing (step S850) illustrated in FIG. 8A. The power trading management apparatus 10 determines whether or not a sales trading (single sales trading) is established between the supply application and the demand application of the power except for the power storage and discharge application data 4C, and assigns the trading ID 205 to the established trading in the power trading management data 200 (step S851).

The power trading management apparatus 10 determines whether or not there is the established sales trading of the power except for the storage and discharge available list data 330 (step S852).

In the determination of step S852, when it is determined that there is the established sales trading of the power except for the storage and discharge available list data 330 (step S852: Yes), the power trading management apparatus 10 notifies the supply-side computer 20 that the trading is established (step S853). In this example, an example in which the power trading management apparatus 10 notifies the supply-side computer 20-1 that the trading is established is illustrated. Specifically, for example, the power trading management apparatus 10 notifies the supply-side computer 20-1 that the trading is established at 10,000 yen as the supply price of the power.

The power trading management apparatus 10 also notifies the demand-side computer 30 that the trading is established (step S854). In this example, an example in which the power trading management apparatus 10 notifies the demand-side computer 30-1 that the trading is established is illustrated. Specifically, for example, the power trading management apparatus 10 notifies the demand-side computer 30-1 that the trading is established at 10,000 yen as the demand price of the power.

The power trading management apparatus 10 transmits a power transmission request to the power transmission switching apparatus 50 such that the power can be transmitted from the power supply apparatus 20-1 to the power demand apparatus 30-1 (step S855).

In the determination of step S852, when it is determined that there is not the established sales trading of the power except for the storage and discharge available list data 330 (step S852: No), the power trading management apparatus 10 confirms the storage and discharge available list data 330 (step S856).

The power trading management apparatus 10 determines the trading establishment of the power by combining the supply application, the demand application, and the storage and discharge available application of the power for which the trading is not established, and assigns the trading ID 205 to the established trading in the power trading management data 200 (step S857).

Specifically, for example, in order to establish the trading, it is necessary to satisfy the following trading conditions and decide the amount of transmitted power to be transmitted to the power demand apparatus 30.

Specifically, for example, the power trading management apparatus 10 determines whether or not the first trading condition is satisfied. For example, in the frame 102 of FIG. 2, a storage and discharge period is the time zone 201 (from 12:00 to 13:59), the supply period is the time zone 201 (from 12:00 to 12:59), and the request period is the time zone 201 (from 13:00 to 13:59). Accordingly, the frame 102 of FIG. 2 satisfies the first trading condition.

The power trading management apparatus 10 determines whether or not the second trading condition is satisfied. In the frame 102 of FIG. 2, the amount of supplied power and the amount of stored and discharged power are both 1 [MWh], and the amount of requested power and the amount of stored and discharged power are both 1 [MWh]. Accordingly, the frame 102 of FIG. 2 satisfies the second trading condition.

The power trading management apparatus 10 determines whether or not the third trading condition is satisfied. In the frame 102 of FIG. 2, the supply price and the request price are both 10,000 yen. Accordingly, the frame 102 of FIG. 2 satisfies the third trading condition.

When at least the first trading condition and the second trading condition among the first trading condition to the third trading condition are satisfied, the power trading management apparatus 10 decides the amount of requested power as the amount of transmitted power on the assumption that the sales trading (cooperative sales trading) is established. In the example of the first embodiment, since the first trading condition to the third trading condition are satisfied, the power trading management apparatus 10 decides the amount of requested power as the amount of transmitted power on the assumption that the sales trading (cooperative sales trading) is established. By doing this, the matching is executed.

When the second trading condition is not satisfied, the power trading management apparatus 10 may decide the amount of supplied power as the amount of transmitted power. This is because the power storage and discharge apparatus 40 can discharge the power only up to the amount of stored power. When the second trading condition is not satisfied, the power trading management apparatus 10 may decide, as the amount of transmitted power, the smaller amount of power of the amount of supplied power and the amount of requested power. Since it is only required that the demand operator can acquire the amount of requested power, when the amount of requested power is smaller than the amount of supplied power, the amount of transmitted power becomes the amount of requested power. Meanwhile, when the amount of supplied power is smaller than the amount of requested power, since the power storage and discharge apparatus 40 can discharge the power only up to the amount of stored power, the amount of transmitted power becomes the amount of supplied power.

The power trading management apparatus 10 determines whether or not there is the established sales trading (cooperative sales trading) of the power including the storage and discharge available list data 330 (step S858).

In the determination of step S858, when it is determined that there is the established sales trading of the power including the storage and discharge available list data 330 (step S858: Yes), the power trading management apparatus 10 notifies the supply-side computer 20-2 that the power trading including the storage and discharge is established (step S859). Specifically, for example, the power trading management apparatus 10 notifies the supply-side computer 20-2 that the trading is established at 10,000 yen as the price of the power supply and 1,000 yen as the price of the storage and discharge (assuming that the supply operator and the demand operator halve the storage and discharge application price, half of 2,000 yen).

The power trading management apparatus 10 notifies the demand-side computer 30-2 that the power trading including the storage and discharge is established (step S860). Specifically, for example, the power trading management apparatus 10 notifies the demand-side computer 30-2 that the trading is established at 10,000 yen as the demand price of the power and 1,000 yen as the storage and discharge price (assuming that the supply operator and the demand operator halve the storage and discharge application price, half of 2,000 yen).

The power trading management apparatus 10 notifies the power-storage-and-discharge-side computer 40-1 that the power trading including the storage and discharge is established (step S861). Specifically, for example, the power trading management apparatus 10 notifies the power storage and discharge system 40-1 that the trading is established at 2,000 yen as the price of the storage and discharge (halved by the supply operator and the demand operator of the power).

The power trading management apparatus 10 transmits a power transmission request to the power transmission switching apparatus 50 such that the power can be transmitted from the power supply system 20-2 to the power storage and discharge system 40-1 and the power can be transmitted from the power storage and discharge system 40-1 to the power demand system 30-2 (step S862).

In the determination of step S858, when it is determined that there is not the established sales trading of the power including the storage and discharge available list data 330 (step S858: No), the power trading management apparatus 10 ends the processing of the power trading (step S863).

As described above, in the first embodiment, since the sales trading establishment of the power is determined by combining the supply application, the demand application, and the storage and discharge available application of the power, it is possible to assist the trading establishment of the power by using a storage and discharge function even when the time during which the power is supplied and the time during which the power is required are different. Accordingly, the supply operator of the power can sell and effectively use the power to be wasted when there is not the demand operator of the power in a desired time zone.

When there is not the supply operator of the power in the desired time zone, the demand operator can purchase the power at a place where it is inconvenient to purchase the power, and can eliminate the inconvenience. The storage and discharge operator can utilize the power by shifting a time in a situation in which a supply time and a demand time of the power do not match, and can contribute to improvement of a power utilization rate.

Second Embodiment

In a second embodiment, an operation when the power storage and discharge apparatus 40 used by the power supply apparatus 20 and the power storage and discharge apparatus 40 used by the power demand apparatus 30 are different in a case where the time during which the power is supplied and the time during which the power is required are different and the power transmission side can absorb the time condition by a power storage apparatus will be described. Hereinafter, an operation of power trading management according to the second embodiment will be described with reference to FIGS. 9 to 12B. The same components as those of the first embodiment will be assigned the same reference signs, and the description thereof will be omitted.

System Configuration

FIG. 9 is a block diagram illustrating a system configuration example of a power trading system 100 according to the second embodiment. In the power trading system 100 according to the second embodiment, n power supply systems 20 (20-1 to 20-n), m power demand systems 30 (30-1 to 30-m), k power storage and discharge systems 40 (40-1 to 40-k), and j power transmission switching apparatuses 50 (50-1 to 50-j) are connected in addition to the power trading management apparatus 10 in the power trading system 100 of the first embodiment. Here, n, m, k, and j are integers of 1 or more. The application data includes positional information (for example, latitude and longitude) of the apparatus as an application source in addition to the processing type 401, the trading type 402, the time zone 403, the power 404, the amount of power 405, the price 406, and the apparatus ID 407.

In the second embodiment, an operation of transmitting the power from the power supply apparatus 20-2 in the power trading system 100, storing the power in the power storage and discharge apparatus 40-1, discharging the power from the power storage and discharge apparatus 40-4, and receiving and consuming the power by the power demand apparatus 30-2 will be described an example.

Power Trading Management Data

Figure 10:
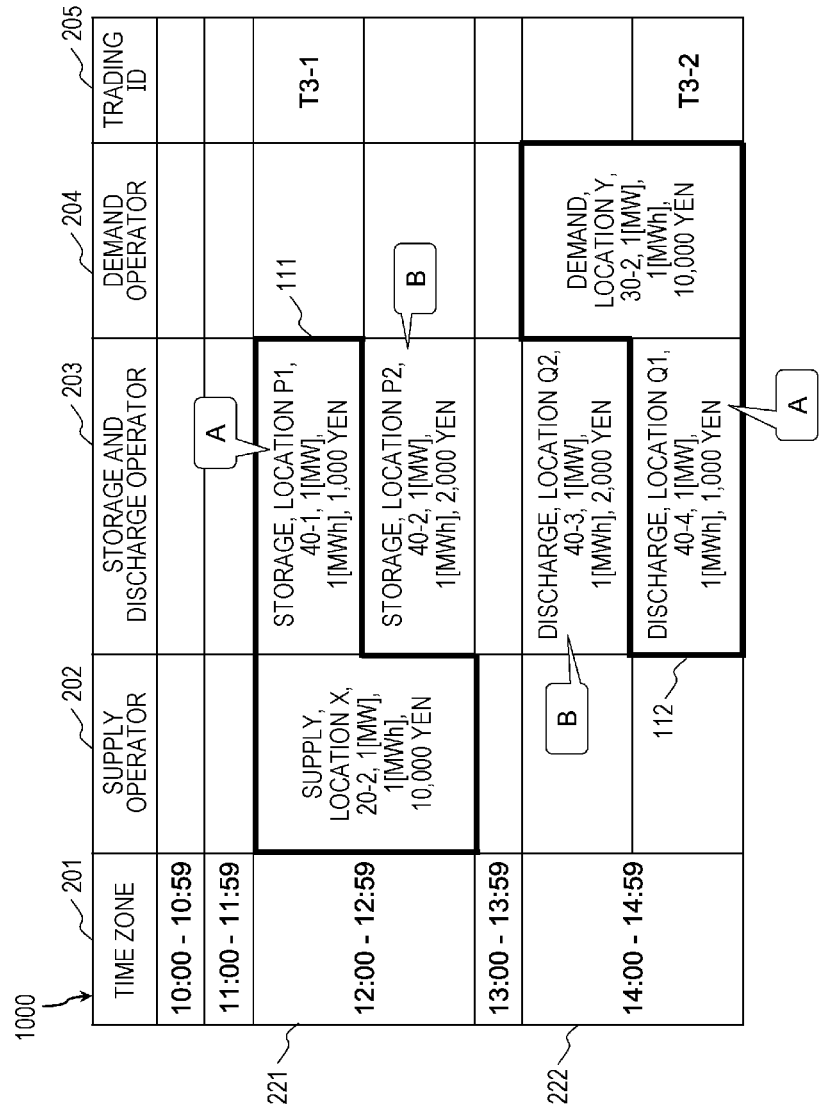
FIG. 10 is an explanatory diagram illustrating an example of power trading management data in the second embodiment.

FIG. 10 is an explanatory diagram illustrating an example of power trading management data in the second embodiment. Power trading management data 1000 includes fields 201 to 205 similar to the power trading management data 200 described with reference to FIG. 2.

In the time zone 201 (from 12:00 to 12:59) represented in a row 221, data such as "20-2" as the apparatus ID 307 of the power supply apparatus 20, a position "X" as a supply position of the power supply apparatus 20-2, "1 [MW]" as the power 304 to be supplied, "1 [MWh]" as the amount of power 305 to be supplied, and "10,000 yen" as the (desired supply) price 306 is recorded as the supply operator relevant information 202 based on the application from the supply operator. However, in this time zone 201, the demand operator relevant information 204 is not recorded, and the trading is not established as a single time zone.

In the time zone 201 (from 14:00 to 14:59) represented in a row 222, data such as "30-2" as the apparatus ID 307 of the power demand apparatus 30, a position "Y" as a demand position of the power demand apparatus 30-2, "1 [MW]" as the (demanded) power 304, "1 [MWh]" as the amount of (demanded) power 305, and "10,000 yen" as the (desired demand) price 306 is recorded as the demand operator relevant information 204 based on the application from the demand operator. However, in this time zone 201, the supply operator relevant information 202 is not recorded, and the trading is not established as a single time zone.

Meanwhile, in the time zone 201 (from 12:00 to 12:59) of the row 221, data such as "40-1" as the apparatus ID 307 of the power storage and discharge apparatus 40, a position "P1" as a storage position of the power storage and discharge apparatus 40-1, "1 [MW]" as the power 304 to be stored, "1 [MWh]" as the amount of power 305 to be stored, and "1,000 yen" as the (desired storage) price 306 is recorded as the storage and discharge operator relevant information 203 based on the application from the storage and discharge operator A.

Data such as "40-2" as the apparatus ID 307 of the power storage and discharge apparatus 40, a position "P2" as a storage position of the power storage and discharge apparatus 40-2, "1 [MW]" as the power 304 to be stored, "1 [MWh]" as the amount of power 305 to be stored, and "2,000 yen" as the (desired storage) price 306 is recorded as the storage and discharge operator relevant information 203 based on the application from the storage and discharge operator B.

In the time zone 201 (from 14:00 to 14:59) of the row 222, data such as "40-3" as the apparatus ID 307 of the power storage and discharge apparatus 40, a position "Q2" as a discharge position of the power storage and discharge apparatus 40-3, "1 [MW]" as the power 304 to be discharged, "1 [MWh]" as the amount of power 305 to be discharged, and "2,000 yen" as the (desired discharge) price 306 is recorded as the storage and discharge operator relevant information 203 based on the application from the storage and discharge operator B.

Data such as "40-4" as the apparatus ID 307 of the power storage and discharge apparatus 40, a position "Q1" as a discharge position of the power storage and discharge apparatus 40-4, "1 [MW]" as the power 304 to be discharged, "1 [MWh]" as the amount of power 305 to be discharged, and "1,000 yen" as the (desired discharge) price 306 is recorded as the storage and discharge operator relevant information 203 based on the application from the storage and discharge operator A.

Here, it is assumed that the storage and discharge operator A which offers a low price for the storage and discharge is selected. In this case, the time zone 201 which is the supply period of the supply operator relevant information 202 of a frame 111 is from 12:00 to 12:59, and the time zone 201 which is the storage period of the storage and discharge operator relevant information 203 of the storage and discharge operator A of the frame 111 is also from 12:00 to 12:59.

Similarly, the time zone 201 which is the request period of the demand operator relevant information 204 of a frame 112 is from 14:00 to 14:59, and the time zone 201 which is the discharge period of the storage and discharge operator relevant information 203 of the storage and discharge operator A of the frame 112 is also from 14:00 to 14:59.

The time zone 201 which is the request period of the demand operator relevant information 204 of the frame 112 is from 14:00 to 14:59, and the time zone 201 which is the supply period of the supply operator relevant information 202 of the frame 111 is from 12:00 to 12:59 before the request period. Accordingly, when the storage and discharge operator A is selected, the first trading condition is satisfied.

The amount of supplied power of the supply operator relevant information 202 of the frame 111 is 1 [MWh], and the amount of stored power of the storage and discharge operator relevant information 203 of the storage and discharge operator A of the frame 111 is also 1 [MWh]. Similarly, the amount of requested power of the demand operator relevant information 204 of the frame 112 is 1 [MWh], and the amount of discharged power of the storage and discharge operator relevant information 203 of the storage and discharge operator A of the frame 112 is also 1 [MWh]. Accordingly, when the storage and discharge operator A is selected, the second trading condition is also satisfied.

The supply price of the supply operator relevant information 202 of the frame 111 is 10,000 yen, and the request price of the demand operator relevant information 204 of the frame 112 is also 10,000 yen. Accordingly, when the storage and discharge operator A is selected, the third trading condition is also satisfied.

Accordingly, the power trading can be performed by storing the power supplied from the power supply apparatus 20-2 in the power storage and discharge apparatus 40-1 and transmitting the power discharged from the power storage and discharge apparatus 40-4 to the power demand apparatus 30-2 as represented in the frame 112.

As a result, "T3-1" is recorded as the trading established in the time zone 201 (from 12:00 to 12:59) of the row 221 in the trading ID 205 of the power trading management data 1000. "T3-2" is recorded as the trading established in the time zone 201 (from 14:00 to 14:59) of the row 222 in the trading ID 205 of the power trading management data 1000.

Figure 11:
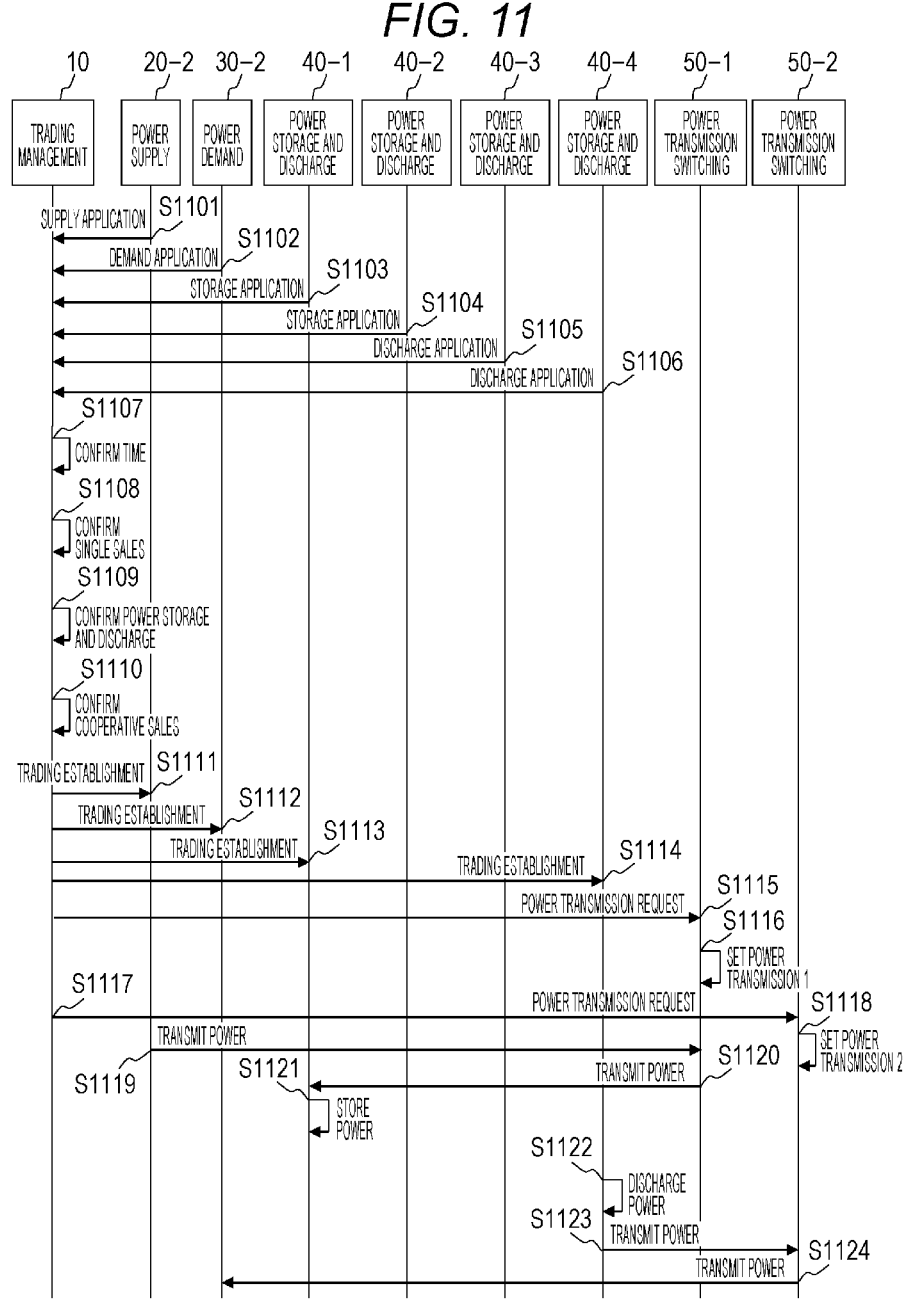
FIG. 11 is a sequence diagram illustrating a power trading sequence example in the second embodiment.

FIG. 11 is a sequence diagram illustrating an example of a power trading sequence in the second embodiment. The supply-side computer 20-2 transmits a supply application for selling the power to the power trading management apparatus 10 (step S1101). The content of the supply application includes, for example, a position (X) in addition to the time zone 403 (from 12:00 to 12:59), the power 404 (1 [MW]), the amount of power 405 (1 [MWh]), the price 406 (10,000 yen), and the apparatus ID 407 (20-2) of the power supply application data 4A2 described with reference to FIG. 4A2.

The demand-side computer 30-2 transmits a demand application for purchasing the power to the power trading management apparatus 10 (step S1102). The content of the demand application includes, for example, a position (Y) in addition to the time zone 403 (from 14:00 to 14:59), the power 404 (1 [MW]), the amount of power 405 (1 [MWh]), the price 406 (10,000 yen), and the apparatus ID 407 (30-2).

The power-storage-and-discharge-side computer 40-1 transmits a power storage application capable of storing the power to the power trading management apparatus 10 (step S1103). The content of the power storage application includes, for example, a position (P1) in addition to the time zone 403 (from 12:00 to 12:59), the power 404 (1 [MW]), the amount of power 405 (1 [MWh]), the price 406 (1,000 yen), and the apparatus ID 407 (40-1).

The power-storage-and-discharge-side computer 40-2 transmits a power storage application capable of storing the power to the power trading management apparatus 10 (step S1104). The content of the power storage application includes, for example, a position (P2) in addition to the time zone 403 (from 12:00 to 12:59), the power 404 (1 [MW]), the amount of power 405 (1 [MWh]), the price 406 (2,000 yen), and the apparatus ID 407 (40-2).

The power-storage-and-discharge-side computer 40-3 transmits a discharge application capable of discharging the power to the power trading management apparatus 10 (step S1105). The content of the discharge application includes a position (Q2) in addition to the time zone 403 (from 14:00 to 14:59), the power 404 (1 [MW]), the amount of power 405 (1 [MWh]), the price 406 (2,000 yen), and the apparatus ID 407 (40-3).

The power-storage-and-discharge-side computer 40-4 transmits a discharge application capable of discharging the power to the power trading management apparatus 10 (step S1106). The content of the discharge application includes a position (Q1) in addition to the time zone 403 (from 14:00 to 14:59), the power 404 (1 [MW]), the amount of power 405 (1 [MWh]), the price 406 (1,000 yen), and the apparatus ID 407 (40-4).

The power trading management apparatus 10 confirms whether or not a certain time, for example, 6 hours elapses (step S1107).

When there are the applications for the supply and demand of the power, the power trading management apparatus 10 confirms whether or not there is the matching between the power supply and demand for each time zone 201, and registers the trading establishment when there is the matching (step S1108).

When there is the application for the supply and demand of the power for which the trading is not established only by the combination of the supply application and the demand application of the power, the power trading management apparatus 10 confirms whether or not there is the storage and discharge application (the storage application, the discharge application, and the storage and discharge application) of the power (step S1109).

When there is the storage and discharge application of the power, the power trading management apparatus 10 confirms whether or not the power trading is established for the combination of the supply application, the demand application, and the storage and discharge application of the power (step S1110).

In the trading establishment confirmation, when the power trading is established by combining the supply application, the demand application, and the storage and discharge application of the power, the power trading management apparatus 10 establishes the trading. In the second embodiment, the supply application from the supply-side computer 20-2 can be associated with the storage application from the power-storage-and-discharge-side computer 40-1 or the storage application from the power-storage-and-discharge-side computer 40-2.

The demand application from the demand-side computer 30-2 can be associated with the discharge application from the power-storage-and-discharge-side computer 40-3 or the discharge application from the power-storage-and-discharge-side computer 40-4.

Here, the power trading management apparatus 10 selects the power storage and discharge apparatus 40 of the storage and discharge operator that offers a low price for the storage and discharge based on the price 406 as the trading condition in selecting the trading apparatus. When the trading is established by combining the supply application, the storage and discharge application, and the demand application of the power, the power trading management apparatus 10 notifies the supply-side computer 20-2 that the power trading including the storage and discharge is established (step S1111).

Specifically, for example, the power trading management apparatus 10 notifies that the trading is established at 10,000 yen as the price 406 of the power supply and 1,000 yen as the price 406 of the storage. The price 406 of the power supply is the amount of money received by the supply operator of the power from the demand operator. Here, the supply operator may pay, as a system usage fee, a part of the price 406 of the power supply to the operator that provides the power trading system 100. The supply operator pays the established storage fee to the storage and discharge operator.

The power trading management apparatus 10 notifies the demand-side computer 30-2 that the power trading including the storage and discharge is established (step S1112). Specifically, for example, the power trading management apparatus 10 notifies that the trading is established at 10,000 yen as the price 406 of the power demand and 1,000 yen as the price 406 of the discharge. The price 406 of the power demand is the amount of money paid by the demand operator of the power to the supply operator. Here, the demand operator may pay, as a system usage fee, a part of the price 406 of the power demand to the operator that provides the power trading system 100. The demand operator pays the established discharge fee to the discharge operator.

The power trading management apparatus 10 notifies the power-storage-and-discharge-side computer 40-1 that the power trading including the storage and discharge is established (step S1113). Specifically, for example, the power trading management apparatus 10 notifies that the trading is established at 1,000 yen as the price 406 of the storage. The price 406 of the storage is the amount of money paid by the supply operator of the power. Here, the storage and discharge operator may pay, as a system usage fee, a part of the price 406 of the storage to the operator that provides the power trading system 100.

The power trading management apparatus 10 notifies the power-storage-and-discharge-side computer 40-4 that the power trading including the storage and discharge is established (step S1114). Specifically, for example, the power trading management apparatus 10 notifies that the trading is established at 1,000 yen as the price 406 of the discharge. The price 406 of the discharge is the amount of money paid by the demand operator of the power. Here, the storage and discharge operator may pay, as a system usage fee, a part of the discharge price to the operator that provides the power trading system 100.

The power trading management apparatus 10 transmits a power transmission request to the power transmission switching apparatus 50-1 such that the power can be transmitted from the power supply apparatus 20-2 to the power storage and discharge apparatus 40-1 (step S1115).

The power transmission switching apparatus 50-1 executes the setting of the power transmission according to the power transmission request received from the power trading management apparatus 10 (step S1116).

The power trading management apparatus 10 transmits a power transmission request to the power transmission switching apparatus 50-2 such that the power can be transmitted from the power storage and discharge apparatus 40-4 to the power demand apparatus 30-2 (step S1117).

The power transmission switching apparatus 50-2 executes the setting of the power transmission according to the power transmission request received from the power trading management apparatus 10 (step S1118).

The power supply apparatus 20-1 supplies the power based on the applied power supply under the control of the supply-side computer in the time zone 201 in which the trading is established (step S1119).

The power transmission switching apparatus 50-1 relays the power transmitted from the power supply apparatus 20-2 to the power storage and discharge apparatus 40-1 (step S1120).

The power storage and discharge apparatus 40-1 stores the power relayed from the power transmission switching apparatus 50-1 (step S1121).

The power storage and discharge apparatus 40-4 starts discharging the stored power (step S1122) and executes the power transmission (step S1123) under the control of the power-storage-and-discharge-side computer in the discharge time zone 201 in which the trading is established.

The power transmission switching apparatus 50-2 relays the power transmitted from the power storage and discharge apparatus 40-4 to the power demand apparatus 30-2 (step S1124).

Power Trading Management Processing

Figure 12A:
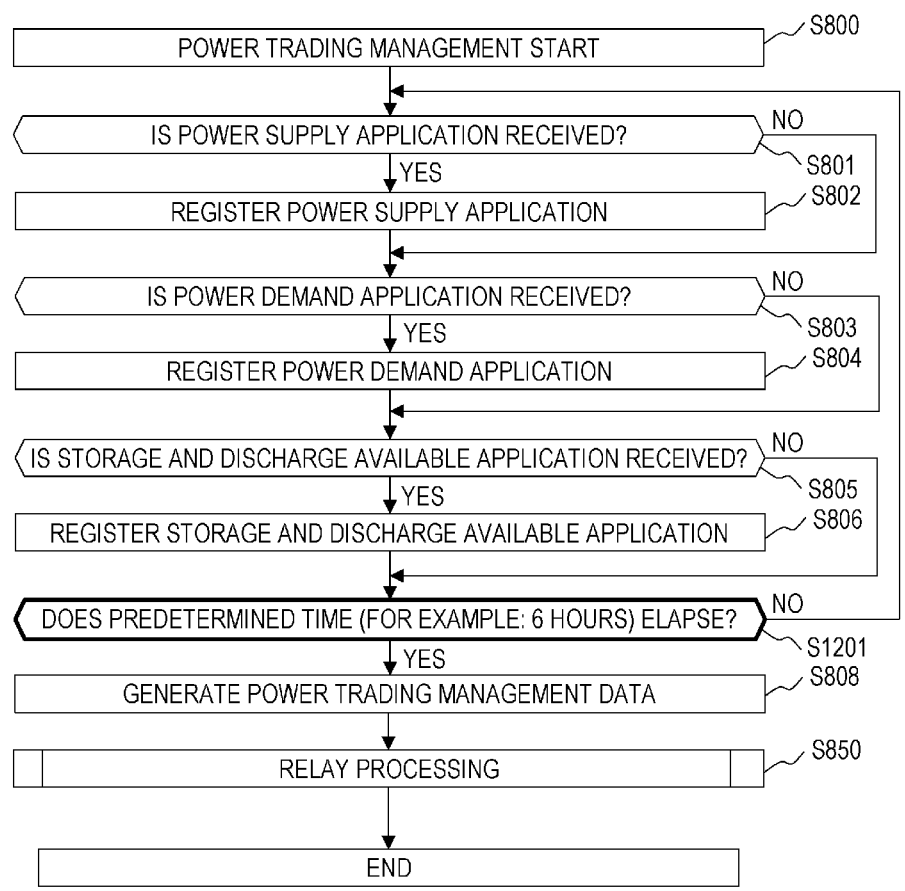
FIG. 12A is a flowchart illustrating a power trading management processing procedure example in the second embodiment.

FIG. 12A is a flowchart illustrating a power trading management processing procedure example in the second embodiment. The same processing as in FIG. 8A is assigned the same step number, and the description thereof will be omitted.

After step S806 is executed, the power trading management apparatus 10 determines whether or not a predetermined time, for example, 6 hours elapses (step S1201).

In the determination of step S1201, when it is determined that the predetermined time does not elapse (step S1201: No), the power trading management apparatus 10 returns to the process of step S801 and executes the processing.

In the determination of step S1201, when it is determined that the predetermined time elapses (step S1201: Yes), the power trading management apparatus 10 generates the power trading management data 1000 (step S808). After step S808 is executed, the power trading management apparatus 10 proceeds to relay processing (step S850).

Figure 12B:
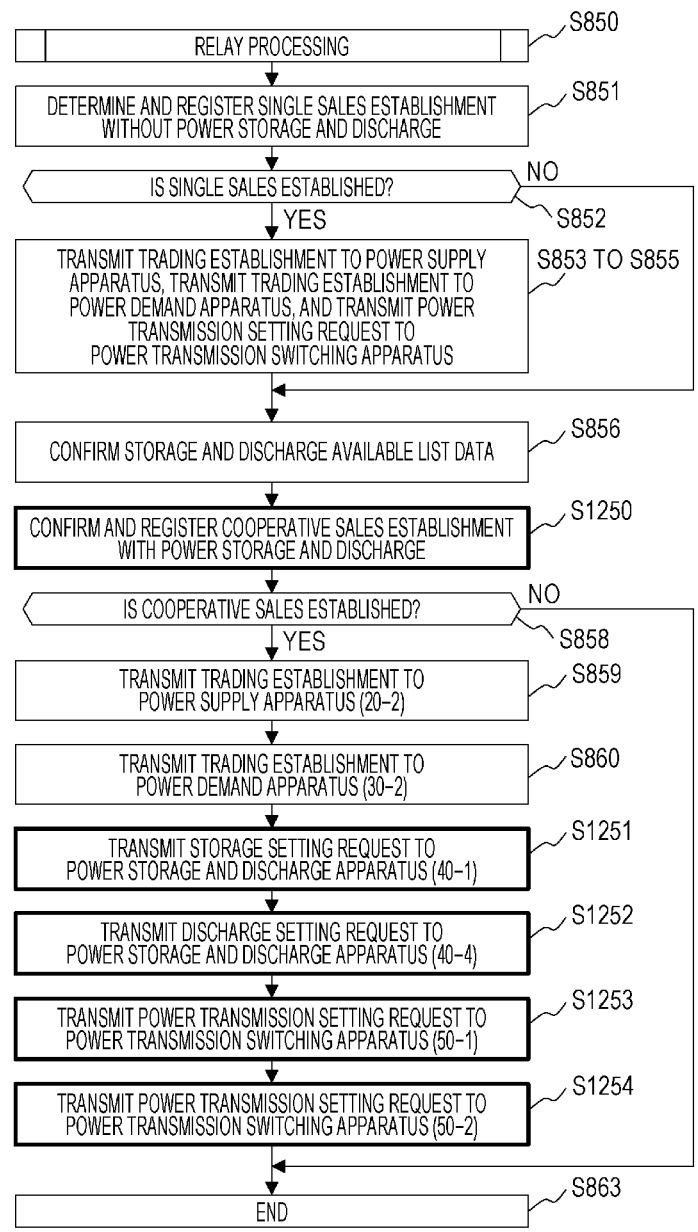
FIG. 12B is a flowchart illustrating a detailed processing procedure example of the relay processing (step S850) illustrated in FIG. 12A.

FIG. 12B is a flowchart illustrating a detailed processing procedure example of the relay processing (step S850) illustrated in FIG. 12A. The same processing as in FIG. 8B is assigned the same step number, and the description thereof will be omitted.

After step S856 is executed, the power trading management apparatus 10 confirms the trading establishment of the power by combining the supply application, the demand application, and the storage and discharge available application of the power for which the trading is not established, and assigns the trading ID 205 to the established trading (step S1250). Specifically, for example, in the second embodiment, the power trading management apparatus 10 preferentially selects the power storage and discharge apparatus of the storage and discharge operator that offers a low price for the storage and discharge based on the price as the condition in selecting the trading apparatus.

Subsequently, the power trading management apparatus 10 executes steps S858 to S860. After step S860 is executed, the power trading management apparatus 10 notifies the power-storage-and-discharge-side computer 40-1 that the power trading including the storage and discharge is established (step S1251). Specifically, for example, the power trading management apparatus 10 notifies the power-storage-and-discharge-side computer 40-1 that the trading is established at 1,000 yen as the price 406 of the storage and storage setting is required.

The power trading management apparatus 10 notifies the power-storage-and-discharge-side computer 40-4 that the power trading including the storage and discharge is established (step S1252). Specifically, for example, the power trading management apparatus 10 notifies the power-storage-and-discharge-side computer 40-4 that the trading is established at 1,000 yen as the price 406 of the discharge and discharge setting is required.

The power trading management apparatus 10 notifies the power transmission switching apparatus 50-1 that the power transmission setting is required such that the power can be transmitted from the power supply apparatus 20-2 to the power storage and discharge apparatus 40-1 (step S1253).

The power trading management apparatus 10 notifies the power transmission switching apparatus 50-2 that the power transmission setting is required such that the power can be transmitted from the power storage and discharge apparatus 40-4 to the power demand apparatus 30-2 (step S1254). After step S1254 is executed, the power trading management processing is ended (step S863).

As described above, in the second embodiment, even when the time during which the power is supplied and the time during which the power is required are different and the power storage and discharge apparatus 40 with which the power supply apparatus 20 matches and the power storage and discharge apparatus 40 with which the power demand apparatus 30 matches are different, when the power storage and discharge apparatus 40 can absorb the time condition, the trading of the power can be performed. The power-storage-and-discharge-side computer 40 that offers a low price as the condition to the supply-side computer 20 and the power-storage-and-discharge-side computer 40 that offers a low price as the condition to the demand-side computer 30 are matched with each other, and thus, the matching corresponding to the condition for the determination can be performed.

Third Embodiment

In a third embodiment, an operation of establishing the power trading when the time during which the power is supplied and the time during which the power is required are different and a time and a position of the supply and demand of the power can be absorbed by using a mobile object capable of moving the power such as an Electric Vehicle (EV) will be described. Hereinafter, an operation of power trading management according to the third embodiment will be described with reference to FIGS. 13 to 16. In the third embodiment, the matching described in the first embodiment is applied when the trading is established. A power trading management processing procedure example is the same processing as in FIG. 8A of the first embodiment. The same components as those of the first embodiment will be assigned the same reference signs, and the description thereof will be omitted.

System Configuration

Figure 13:
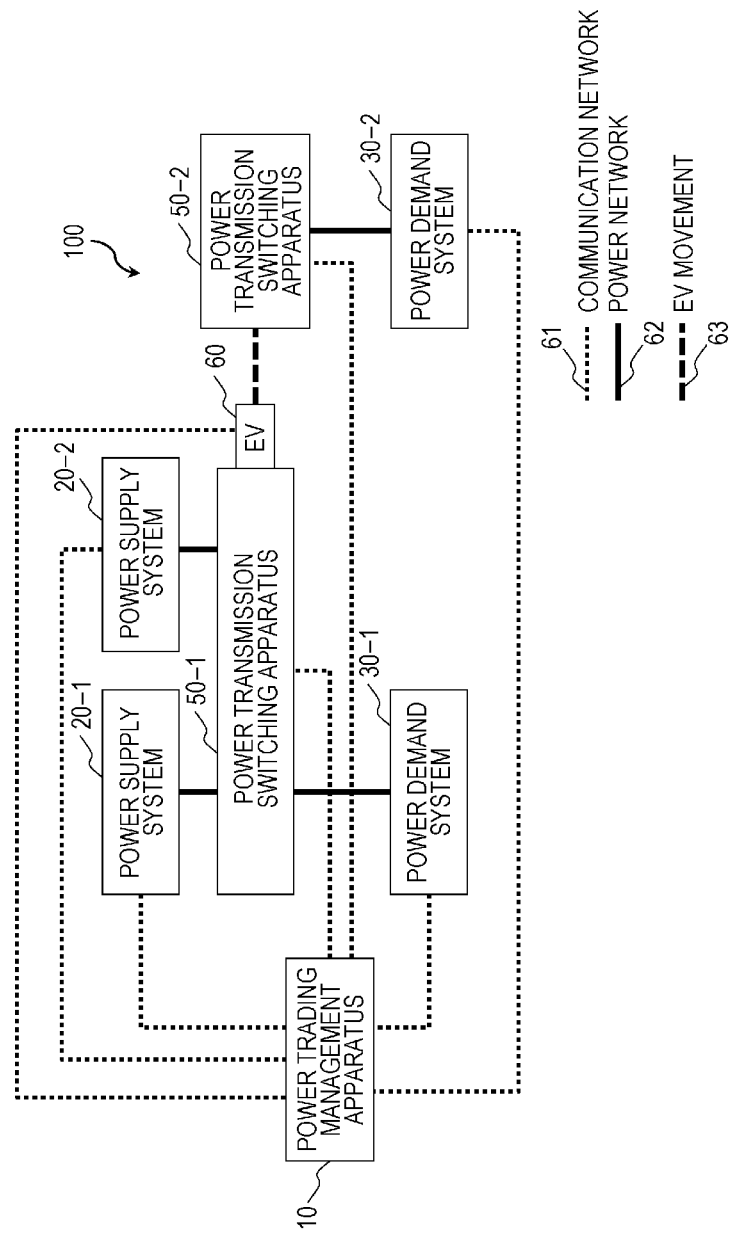
FIG. 13 is a block diagram illustrating a system configuration example of a power trading system according to a third embodiment.

FIG. 13 is a block diagram illustrating a system configuration example of a power trading system 100 according to the third embodiment. In the power trading system 100 according to the third embodiment, the power transmission switching apparatus 50-2 is added by using an EV 60 as a movable power storage and discharge system instead of the power storage and discharge system 40-1 in the power trading system 100 according to the first and second embodiments. In the third embodiment, the power supply system 20-2 supplies the power, the EV 60 stores the power via the power transmission switching apparatus 50-1 and then moves to the power transmission switching apparatus 50-2, and the power demand system 30-2 consumes the power discharged from the EV 60 connected to the power transmission switching apparatus 50-2.

The movement of EV 60 is indicated by a thick dotted line of a reference sign 63. The EV 60 may be driven by a human or may be automatically driven. The EV 60 may be moved by being controlled by the power trading management apparatus 10, or may be moved without being controlled by the power trading management apparatus 10. A method of connecting the EV 60 and the power transmission switching apparatus 50 is not limited in this specification (for example, the connection is performed by a person), but the EV 60 and the power transmission switching apparatus 50 may be connected so as to be able to transmit the power. The same components as those of the first and second embodiments are assigned the same reference signs, and the description thereof will be omitted.

Power Trading Management Data

FIG. 14 is an explanatory diagram illustrating an example of power trading management data in the third embodiment. Power trading management data 1400 includes fields 201 to 205 similar to the power trading management data 1000 described with reference to FIG. 10.

In the time zone 201 (from 12:00 to 12:59) represented in a row 231, data such as "20-2" as the apparatus ID 307 of the power supply apparatus 20, a position "R" as a supply position of the power supply apparatus 20, "0.1 [MW]" as the power 304 to be supplied, "0.1 [MWh]" as the amount of power 305 to be supplied, and "10,000 yen" as the (desired supply) price 306 is recorded as the supply operator relevant information 202 based on the application from the supply operator. However, in this time zone 201 and the position, the demand operator relevant information 204 based on the application from the demand operator is not recorded, and the trading is not established as a single time zone.

In the time zone 201 (from 14:00 to 14:59) represented in a row 232, data such as "30-2" as the apparatus ID 307 of the power demand apparatus 30, a position "Z" as a demand position of the power demand apparatus 30, "0.1 [MW]" as the (demand) power 304, "0.1 [MWh]" as the amount of (demanded) power 305, and "10,000 yen" as the (desired demand) price 306 is recorded as the demand operator relevant information 204 based on the application from the demand operator. However, in this time zone 201 and the position, the supply operator relevant information 202 based on the application from the supply operator is not recorded, and the trading is not established in this time zone 201 and the position.

Meanwhile, in the time zone 201 (12:00 to 12:59) of the row 231, data such as a mobile EV storage, a position "Y" as a storage position of the power transmission switching apparatus 50-1, "0.1 [MW]" as the power 304 to be stored, "0.1 [MWh]" as the amount of power 305 to be stored, and "1,000 yen" as the (desired storage) price 306 is recorded as the storage and discharge operator relevant information 203 based on the application from the storage and discharge operator A.

In the time zone 201 (from 14:00 to 14:59) of the row 232, data such as a mobile EV discharge, a position "Z" as a discharge position of the power transmission switching apparatus 50-2, "0.1 [MW]" as the power 304 to be discharged, "0.1 [MWh]" as the amount of power 305 to be discharged, and "1,000 yen" as the (desired discharge) price 306 is recorded as the storage and discharge operator relevant information 203 based on the application from the storage and discharge operator A.

Here, the trading of the power can be performed by storing the power supplied from the power supply apparatus 20-2 in the EV 60 at the position "Y" as represented in the frame 121 and consuming the power discharged from the EV 60 after the movement at the position "Z" by the power demand apparatus 30-2 as represented in the frame 122.

As a result, "T4-1" is recorded as the trading established in the time zone 201 (from 12:00 to 12:59) of the row 231 in the trading ID 205 of the power trading management data 1400. "T4-2" is recorded as the trading established in the time zone 201 (from 14:00 to 14:59) of the row 232 in the trading ID 205 of the power trading management data 1400. In the third embodiment, "Y" and "Z" are designated as the positions of the EV 60, but a city name, a range using coordinate axes, and the like may be designated.

Power Trading Sequence

Figure 15:
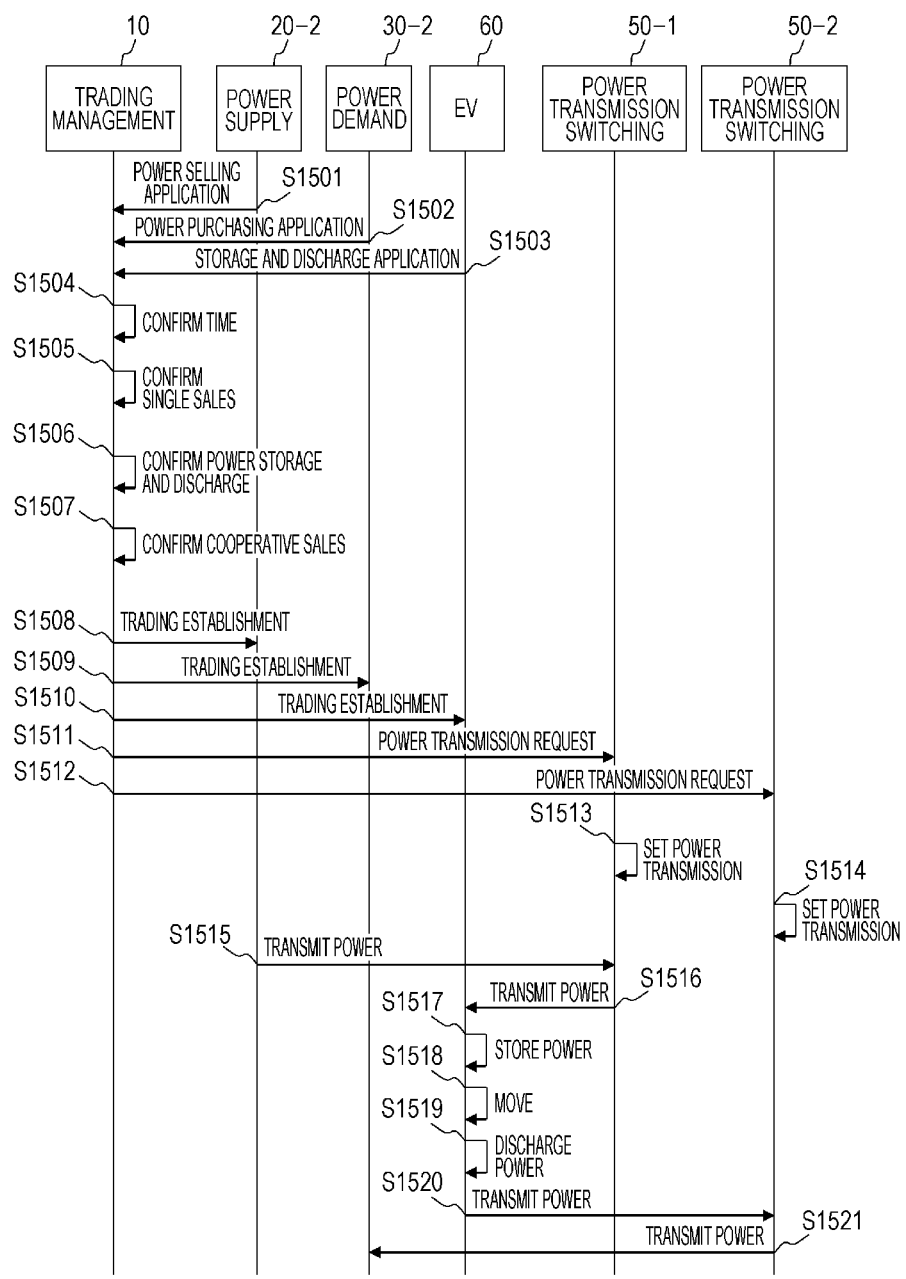
FIG. 15 is a sequence diagram illustrating an example of a power trading sequence in the third embodiment.

FIG. 15 is a sequence diagram illustrating an example of a power trading sequence in the third embodiment. The supply-side computer 20-2 transmits a supply application for selling the power to the power trading management apparatus 10 (step S1501). The content of the supply application includes, for example, a position (R) in addition to the time zone 403 (from 12:00 to 12:59), the power 404 (0.1 [MW]), the amount of power 405 (0.1 [MWh]), the price 406 (10,000 yen), and the apparatus ID 407 (20-2).

The demand-side computer 30-2 transmits a demand application for purchasing the power to the power trading management apparatus 10 (step S1502). The content of the demand application includes, for example, a position (Z) in addition to the time zone 403 (from 14:00 to 14:59), the power 404 (0.1 [MW]), the amount of power 405 (0.1 [MWh]), the price 406 (10,000 yen), and the apparatus ID 407 (30-2).

The EV 60 transmits a power storage application capable of storing the power to the power trading management apparatus 10 (step S1503). The content of the power storage application includes a position (R) in addition to the time zone 403 (from 12:00 to 12:59), the power 404 (0.1 [MW]), the amount of power 405 (0.1 [MWh]), the price 406 (1,000 yen), and the apparatus ID 407 (60).

The EV 60 also transmits a storage application capable of storing the power to the power trading management apparatus 10 (step S1503). The content of the power storage application includes, for example, a position (Z) in addition to the time zone 403 (from 12:00 to 12:59), the power 404 (0.1 [MW]), the amount of power 405 (0.1 [MWh]), the price 406 (1,000 yen), and the apparatus ID 407 (40-2). When the EV 60 can move from the position R to the position Z in the time zone 403 (from 13:00 to 13:59), the EV transmits a charge available application and a discharge available application to the power trading management apparatus 10.

The power trading management apparatus 10 confirms whether or not a certain time, for example, 6 hours elapses (step S1504).

When there are the applications for the power supply or demand, the power trading management apparatus 10 confirms whether or not there is the matching between the supply and demand of the power for each time zone 201, and registers the trading establishment when there is the matching (step S1505).

When there is the applications for the supply and demand of the power for which the trading is not established only by the combination of the supply application and the demand application of the power, the power trading management apparatus 10 confirms whether or not there is the storage and discharge application (the storage application, the discharge application, and the storage and discharge application) of the power (step S1506). In the third embodiment, the storage and discharge application of the power from the EV 60 is confirmed.

When there is the storage and discharge application of the power, the power trading management apparatus 10 confirms whether or not the trading of the power is established for the combination of the supply application, the demand application, and the storage and discharge application of the power by using the power trading management data 1000 (step S1507). In the trading establishment confirmation, when the power trading is established by combining the supply application, the demand application, and the storage and discharge application of the power, the power trading management apparatus 10 establishes the trading.

In the third embodiment, the storage application from the EV 60 can be associated with the supply application from the supply-side computer 20-2. The discharge application from the EV 60 can be associated with the demand application from the demand-side computer 30-2.

When the trading is established by combining the supply application, the storage and discharge application, and the demand application of the power, the power trading management apparatus 10 notifies the supply-side computer 20-2 that the power trading including the storage and discharge is established (step S1508). Specifically, for example, the power trading management apparatus 10 notifies that the trading is established at 10,000 yen as the price 406 of the power supply and 1,000 yen as the price 406 of the storage.

The price 406 of the power supply is the amount of money received by the supply operator of the power from the demand operator. Here, the supply operator may pay, as a system usage fee, a part of the price 406 of the power supply to the operator that provides the power trading system 100. The supply operator pays the established storage fee to the storage and discharge operator.

The power trading management apparatus 10 notifies the demand-side computer 30-2 that the power trading including the storage and discharge is established (step S1509). Specifically, for example, the power trading management apparatus 10 notifies that the trading is established at 10,000 yen as the price 406 of the power demand and 1,000 yen as the price 406 of the discharge.

The price 406 of the power demand is the amount of money paid by the demand operator of the power to the supply operator. Here, the demand operator may pay, as a system usage fee, a part of the demand price to the operator that provides the power trading system 100. The demand operator pays the established discharge fee to the discharge operator.

The power trading management apparatus 10 notifies the EV 60 that the power trading including the storage and discharge is established (step S1510). Specifically, for example, the power trading management apparatus 10 notifies that the trading is established at 1,000 yen as the price 406 of the storage and 1,000 yen as the price 406 of the discharge. The price 406 of the storage and the price 406 of the discharge are the amounts of money paid by the supply operator and the demand operator of the power. Here, the storage and discharge operator may pay, as a system usage fee, a part of the storage price and the discharge price to the operator that provides the power trading system 100.

The power trading management apparatus 10 transmits a power transmission request to the power transmission switching apparatus 50-1 such that the power can be transmitted from the power supply apparatus 20-2 to the EV 60 (step S1511).

The power trading management apparatus 10 transmits a power transmission request to the power transmission switching apparatus 50-2 such that the power can be transmitted from the EV 60 to the power demand apparatus 30-2 (step S1512).

The power transmission switching apparatus 50-1 executes the setting of the power transmission according to the power transmission request received from the power trading management apparatus 10 (step S1513).

The power transmission switching apparatus 50-2 executes the setting of the power transmission according to the power transmission request received from the power trading management apparatus 10 (step S1514).

The power supply system 20-1 supplies the power based on the applied power supply in the time when the trading is established (step S1515).

The power transmission switching apparatus 50-1 relays the power transmitted from the power supply system 20-2 to the EV 60 (step S1516).

The EV 60 stores the power relayed from the power transmission switching apparatus 50-1 (step S1517).

After the power supplied from the power supply system 20-2 is stored, the EV 60 moves from the position Y to the position Z and is connected to the power transmission switching apparatus 50-2 (step S1518).

In the time when the trading is established, the EV 60 starts discharging the stored power (step S1519) and executes the power transmission (step S1520).

The power transmission switching apparatus 50-2 relays the power transmitted from the EV 60 to the power demand system 30-2 (step S1521).

Figure 16:
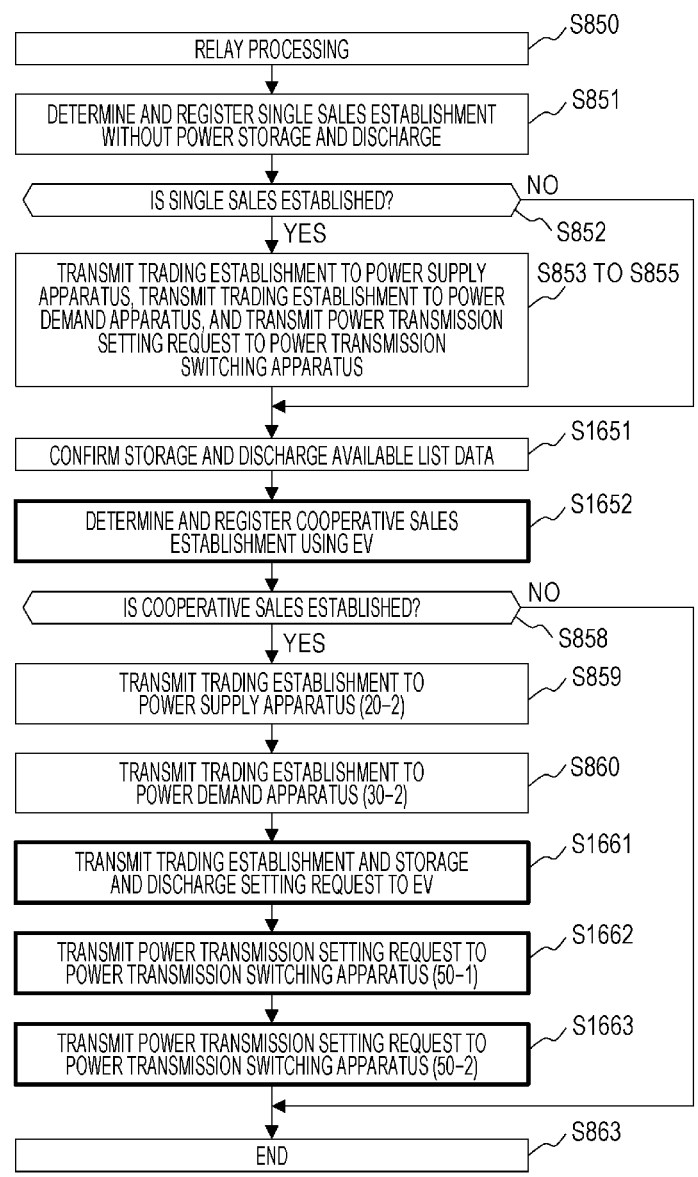
FIG. 16 is a flowchart illustrating a detailed processing procedure example of the relay processing (step S850) illustrated in FIG. 8A.

FIG. 16 is a flowchart illustrating a detailed processing procedure example of the relay processing (step S850) illustrated in FIG. 8A. The same processing as in FIG. 8B is assigned the same step number, and the description thereof will be omitted.

After step S855 is executed, the power trading management apparatus 10 confirms the storage and discharge available list data 330 for the EV 60 (step S1651). The power trading management apparatus 10 determines whether or not the trading of the power is established by combining the supply application and the demand application of the power for which the trading is not established and the storage and discharge available application in the EV 60, decides the amount of transmitted power, and assigns the trading ID 205 to the established trading (step S1652).

Specifically, for example, the time zone 201 which is the supply period of the supply operator relevant information 202 of the frame 121 in FIG. 14 is from 12:00 to 12:59, and the time zone 201 which is the storage period of the storage and discharge operator relevant information 203 of the storage and discharge operator A of the frame 121 is also from 12:00 to 12:59.

Similarly, the time zone 201 which is the request period of the demand operator relevant information 204 of the frame 122 is from 14:00 to 14:59, and the time zone 201 which is the discharge period of the storage and discharge operator relevant information 203 of the storage and discharge operator A of the frame 122 is also from 14:00 to 14:59.

The time zone 201 which is the request period of the demand operator relevant information 204 of the frame 122 is from 14:00 to 14:59, and the time zone 201 which is the supply period of the supply operator relevant information 202 of the frame 121 is from 12:00 to 12:59 before the request period. Accordingly, when the storage and discharge operator A is selected, the first trading condition is satisfied.

There is a free time of one hour (13:00-13:59) between the supply period and the request period, but the EV 60 is disconnected from the power transmission switching apparatus 50-1 within this time, moves to the power transmission switching apparatus 50-2, and can be connected to the power transmission switching apparatus 50-2.

The power trading management apparatus 10 calculates a moving time based on a moving speed of the EV 60 and a distance between the power transmission switching apparatuses 50-1 and 50-2. The power trading management apparatus 10 adds a preset time required for disconnecting the EV from the power transmission switching apparatus 50-1 and a preset time required for connecting the EV to the power transmission switching apparatus 50-2 to the moving time. That is, in the third embodiment, a condition in which the moving time is less than or equal to the free time is also included in the first trading condition.

The amount of supplied power of the supply operator relevant information 202 of the frame 121 is 0.1 [MWh], and the amount of stored power of the storage and discharge operator relevant information 203 of the storage and discharge operator A of the frame 121 is also 0.1 [MWh]. Similarly, the amount of requested power of the demand operator relevant information 204 of the frame 122 is 0.1 [MWh], and the amount of discharged power of the storage and discharge operator relevant information 203 of the storage and discharge operator A of the frame 122 is also 0.1 [MWh]. Accordingly, when the storage and discharge operator A is selected, the second trading condition is also satisfied.

The supply price of the supply operator relevant information 202 of the frame 121 is 10,000 yen, and the request price of the demand operator relevant information 204 of the frame 122 is also 10,000 yen. Accordingly, when the storage and discharge operator A is selected, the third trading condition is also satisfied. Accordingly, the power trading management apparatus 10 decides the amount of transmitted power as in the first embodiment.

After step S1652 is executed, the power trading management apparatus 10 executes steps S858 to S860. After step S860 is executed, the power trading management apparatus 10 notifies EV 60 that the power trading including the storage and discharge is established (step S1661). Specifically, for example, the power trading management apparatus 10 notifies the EV 60 that the trading is established at 1,000 yen as the price 406 of the storage and 1,000 yen as the price 406 of the discharge and the storage and discharge settings are required.

The power trading management apparatus 10 transmits a power transmission request to the power transmission switching apparatus 50-1 such that the power can be transmitted from the power supply apparatus 20-2 to the EV 60 in the designated time zone 201 (from 12:00 to 12:59) (step S1662).

The power trading management apparatus 10 transmits a power transmission request to the power transmission switching apparatus 50-2 such that the power can be transmitted from the EV 60 to the power demand apparatus 30-2 in the designated time zone 201 (from 14:00 to 14:59) (step S1663). After step S1663 is executed, the power trading management apparatus 10 ends the power trading management processing (step S863).

As described above, in the third embodiment, even when the time during which the power is supplied and the time during which the power is required are different and the power supply apparatus 20 and the power demand apparatus 30 are not directly connected to each other via the power network 62 in a wired manner, the establishment of the power trading and the interchanging of the power can be performed by using a moving object capable of moving the power such as the EV 60.

Fourth Embodiment

In a fourth embodiment, power trading management established in a case where a plurality of power supply systems 20 and a plurality of power demand systems 30 are provided will be described. In the fourth embodiment, a case where two power supply systems 20 and two power demand systems 30 are provided will be described as an example, but the number of power supply systems 20 and the number of power demand systems 30 may be three or more. The number of any one of the power supply system 20 and the power demand system 30 may be one.

In the fourth embodiment, the first trading condition is as follows.

First trading condition: the storage period includes the supply period of each of the plurality of power supply apparatuses 20, the discharge period includes the request period of each of the plurality of power demand apparatuses 30, and all the supply periods are periods earlier than any request period.

When there is one power demand apparatus 30, the first trading condition is as follows.

First trading condition: the storage period includes the supply period of each of the plurality of power supply apparatuses 20, the discharge period includes the request period, and all the supply periods are periods earlier than any request period.

When there is one power supply apparatus 20, the first trading condition is as follows.

First trading condition: the discharge period includes the request period of each of the plurality of power demand apparatuses 30, and the supply period is a period earlier than any request period.

In the fourth embodiment, the second trading condition is as follows.

Second trading condition: a total amount of supplied power in a plurality of power supply applications and the amount of stored power in the storage application match each other, and a total amount of requested power in a plurality of power demand applications and the amount of discharged power in the discharge application match each other.

When there is one power demand apparatus 30, the second trading condition is as follows.

Second trading condition: a total amount of supplied power in a plurality of power supply applications and the amount of stored power in the storage application match each other, and a total amount of requested power in the power demand application and the amount of discharged power in the discharge application match each other.

When there is one power supply apparatus 20, the second trading condition is as follows.

Second trading condition: the amount of supplied power in the power supply application and the amount of stored power in the storage application match each other, and the total amount of requested power in the plurality of power demand applications and the amount of discharged power in the discharge application match each other.

In the fourth embodiment, the third trading condition is as follows.

Third trading condition: a total supply price in the plurality of power supply applications and a total request price in the plurality of power demand applications match each other.

When there is one power demand apparatus 30, the third trading condition is as follows.

Third trading condition: a total supply price in the plurality of power supply applications and the request price in the power demand application match each other.

When there is one power supply apparatus 20, the third trading condition is as follows.

Third trading condition: the supply price in the power supply application and the total request price in the plurality of power demand applications match each other.

The power trading management apparatus 10 decides each amount of requested power as the amount of transmitted power for each power demand apparatus 30 in the decision processing. Hereinafter, an operation of the power trading management according to the fourth embodiment will be described with reference to FIG. 17. The same components as those in the first to third embodiments are assigned the same reference signs, and the description thereof will be omitted.

Power Trading Management Data

FIG. 17 is an explanatory diagram illustrating an example of the power trading management data in the fourth embodiment. Power trading management data 1700 includes fields 201 to 205 similar to the power trading management data 200 described with reference to FIG. 2.

In the time zone 201 (from 10:00 to 10:59) represented in a row 241, data such as "20-1" as the apparatus ID 307 of the power supply apparatus 20, "1.5 [MW]" as the power 304 to be supplied, "1.5 [MWh]" as the amount of power 305 to be supplied, and "15,000 yen" as the (desired supply) price 306 is recorded as the supply operator relevant information 202 based on the application from the supply operator A.

In the time zone 201 (from 11:00 to 11:59) represented in a row 242, data such as "20-2" as the apparatus ID 307 of the power supply apparatus 20, "1.5 [MW]" as the power 304 to be supplied, "1.5 [MWh]" as the amount of power 305 to be supplied, and "15,000 yen" as the (desired supply) price 306 is recorded as the supply operator relevant information 202 based on the application from the supply operator B. However, in these time zones 201 (from 10:00 to 11:59), the demand operator relevant information 204 based on the application from the demand operator is not recorded, and the trading is not established.

In the time zone 201 (from 12:00 to 12:59) represented in a row 243, data such as "30-1" as the apparatus ID 307 of the power demand apparatus 30, "1 [MW]" as the (demanded) power 304, "1 [MWh]" as the amount of (demanded) power 305, and "10,000 yen" as the (desired demand) price 306 is recorded as the demand operator relevant information 204 based on the application from the demand operator C.

In the time zone 201 (from 13:00 to 13:59) represented in a row 244, data such as "30-2" as the apparatus ID 307 of the power demand apparatus 30, "2 [MW]" as the (demanded) power 304, "2 [MWh]" as the amount of (demanded) power 305, and "20,000 yen" as the (desired demand) price 306 is recorded as the demand operator relevant information 204 based on the application from the demand operator D. However, in these time zones 201 (from 12:00 to 13:59), the supply operator relevant information 202 based on the application from the supply operator is not recorded, and the trading is not established.

Also, there are difference between the power 304 (1.5 [MW]) and the amount of power 305 (1.5 [MWh]) of the supply operator relevant information 202 represented in the row 241 and the power 304 (1.5 [MW]) and the amount of power 305 (1.5 [MWh]) of the supply operator relevant information 202 represented in the row 242, and the power 304 (1 [MWh]) and the amount of power 305 (1 [MWh]) of the demand operator relevant information 204 represented in the row 243 and the power 304 (2 [MW]) and the amount of power 305 (2 [MWh]) of the demand operator relevant information 204 represented in the row 244 in terms of the power 304 and the amount of power 305, and the trading is not established in a relationship between the demand and supply of 1:1.

Meanwhile, in the time zone 201 (from 10:00 to 13:59) that spans the row 241 to the row 244, data such as "40-1" as the apparatus ID 307 of the power storage and discharge apparatus 40, "2 [MW]" as the power 304 of the storage and discharge, "3 [MWh]" as the amount of power 305 of the storage and discharge, and "3,000 yen" as the (desired storage and discharge) price 306 is recorded as the demand operator relevant information 204 based on the application from the storage and discharge operator. Accordingly, even though there is a one-to-one correspondence between the power supply apparatus 20 and the power demand apparatus 30 and there are differences in the power 304 and the amount of power 305 to be supplied, when the power storage and discharge apparatus 40 absorbs these differences, the trading is established.

Specifically, for example, the time zone 201 which is the supply period of the supply operator relevant information 202 of the supply operator A in the row 241 of FIG. 17 is from 10:00 to 10:59, and is included in 10:00-13:59 as the time zone 201 which is the storage and discharge period of the storage and discharge operator relevant information 203.

Similarly, the time zone 201 which is the supply period of the supply operator relevant information 202 of the supply operator B of the row 242 is from 11:00 to 11:59 and is included in the time zone 201 (from 10:00 to 13:59) which is the storage and discharge period of the storage and discharge operator relevant information 203.

The time zone 201 which is the request period of the demand operator relevant information 204 of the demand operator C of the row 243 is from 12:00 to 12:59, and is included in the time zone 201 (from 10:00 to 13:59) which is the storage and discharge period of the storage and discharge operator relevant information 203.

Similarly, the time zone 201 which is the request period of the demand operator relevant information 204 of the demand operator D of the row 244 is from 13:00 to 13:59, and is included in the time zone 201 (from 10:00 to 13:59) which is the storage and discharge period of the storage and discharge operator relevant information 203. As described above, in the example of the power trading management data 1700, the first trading condition is satisfied.

The amount of supplied power of the supply operator relevant information 202 of the supply operator A of the row 241 is 1.5 [MWh], and the amount of supplied power of the supply operator relevant information 202 of the supply operator B of the row 242 is 1.5 [MWh]. Accordingly, the total amount of supplied power is 3 [MWh]. Meanwhile, the amount of stored and discharged power of the storage and discharge operator relevant information 203 is 3 [MWh]. Accordingly, the total amount of supplied power and the amount of stored and discharged power match each other.

The amount of requested power of the demand operator relevant information 204 of the demand operator C of the row 243 is 1 [MWh], and the amount of requested power of the demand operator relevant information 204 of the demand operator D of the row 244 is 2 [MWh]. Accordingly, the total amount of requested power is 3 [MWh]. Meanwhile, the amount of stored and discharged power of the storage and discharge operator relevant information 203 is 3 [MWh]. Accordingly, the total amount of requested power and the amount of stored and discharged power match each other. As stated above, in the example of the power trading management data 1700, the second trading condition is also satisfied.

The supply price of the supply operator relevant information 202 of the supply operator A of the row 241 is 15,000 [yen], and the supply price of the supply operator relevant information 202 of the supply operator B of the row 242 is 15,000 [yen]. Accordingly, the total supply price is 30,000 [yen].

Meanwhile, the demand price of the demand operator relevant information 204 of the demand operator C of the row 243 is 10,000 [yen], and the demand price of the demand operator relevant information 204 of the demand operator D of the row 244 is 20,000 [yen]. Accordingly, the total demand price is 30,000 [yen]. Accordingly, the total supply price and the total demand price match each other. As stated above, in the example of the power trading management data 1700, the third trading condition is also satisfied.

In order to satisfy the first to third trading conditions, the power trading management apparatus 10 decides 1 [MWh] as the amount of transmitted power from the power storage and discharge apparatus 40-1 to the power demand apparatus 30-1 in the decision processing, and decides 2 [MWh] as the amount of transmitted power from the power storage and discharge apparatus 40-1 to the power demand apparatus 30-2.

Specifically, in the time zone 201 (from 10:00 to 10:59) of the row 241, the power storage and discharge apparatus 40-1 stores the power from the power supply apparatus 20-1. In the time zone 201 (from 11:00 to 11:59) of the row 242, the power storage and discharge apparatus 40-1 stores the power from the power supply apparatus 20-2.

Meanwhile, in the time zone 201 (from 12:00 to 12:59) of the row 243, the power storage and discharge apparatus 40-1 supplies the power to the power demand apparatus 30-1 by discharging (1 [MW], 1 [MWh]). In the time zone 201 (from 13:00 to 13:59) of the row 244, the power storage and discharge apparatus 40-1 supplies the power to the power demand apparatus 30-2 by discharging (2 [MW], 2 [MWh]).

As stated above, the power trading management apparatus 10 determines the first trading condition of whether or not the time zone 201 (the row 241 or the row 242) of each power supply is earlier than the time zone 201 (the row 243 or the row 244) of each power demand. The power trading management apparatus 10 determines whether or not the total amount of supplied power of the plurality of power supply apparatuses 20 matches the amount of stored power applied for by the power storage and discharge apparatus 40 and the amount of stored power matches the amount of requested power of the plurality of power demand apparatuses 30. The power trading management apparatus 10 determines whether or not the total supply price of the plurality of power supply apparatuses 20 matches the total request price of the plurality of power demand apparatuses 30.

When the first trading condition is satisfied and the prices and the amounts of power described above match, the power trading management apparatus 10 decides each amount of requested power as the amount of transmitted power on the assumption that the sales trading (cooperative sales trading) is established. By doing this, the matching is executed.

Due to the operations described above, when the trading of the power can be performed by combining the plurality of power supply apparatuses 20, the power demand apparatuses 30, and the power storage and discharge apparatus 40, the trading is established, and T5-1 to T5-4 are assigned to the trading IDs 205.

As described above, when the transaction of the power can be performed by combining the plurality of power supply apparatuses 20, the plurality of power demand apparatus 30, and the power storage and discharge apparatus 40, the power trading is established. Accordingly, it is possible to increase the amount of traded power.

Fifth Embodiment

In a fifth embodiment, power trading management established when the trading condition on the power demand apparatus 30 side is within a range of a subset condition of the trading condition on the power supply apparatus 20 side in the first to fourth embodiments will be described.

In the fifth embodiment, the first trading condition follows the first trading condition of the first embodiment to the fourth embodiment. In the fifth embodiment, the second trading condition is as follows.

Second trading condition: the amount of requested power in the power demand application is equal to or less than the amount of supplied power in the power supply application. Accordingly, the power demand is satisfied.

When it is determined that the first trading condition (priority is given to the power storage and discharge) and the second trading condition are satisfied, the power trading management apparatus 10 decides, as the amount of transmitted power, the amount of power which is equal to or more than the amount of requested power and is equal to or less than the amount of supplied power in the decision processing. For example, the power trading management apparatus 10 may perform control such that the amount of requested power is transmitted to the power demand apparatus 30 as applied for by the demand operator or may perform control such that the amount of power is transmitted up to the amount of supplied power or less.

When the first trading condition is satisfied but the second trading condition is not satisfied, the power trading management apparatus 10 may decide the amount of supplied power as the amount of transmitted power in the decision processing. That is, the power trading management apparatus 10 performs control such that the power is transmitted to the power demand apparatus 30 by the amount of supplied power.

In the fifth embodiment, the third trading condition is expressed by the following inequality (1).

$$\text{Supply price} \geq (\text{amount of supplied power}/\text{amount of requested power}) \times \text{request price} \quad (1)$$

Accordingly, the demand operator can purchase the amount of power at the request price or less as applied.

In a case where the third trading condition is also applied, when it is determined that the first trading condition, the second trading condition, and the third trading condition are satisfied, the power trading management apparatus 10 decides the amount of requested power as the amount of transmitted power in the decision processing.

In a case where the plurality of power supply apparatuses and the plurality of power demand apparatuses are provided as in the fourth embodiment, the second trading condition is as follows.

Second trading condition: the total amount of the plurality of requested power is equal to or less than the total amount of the plurality of supplied power.

When there is one power demand apparatus 30, the second trading condition is as follows.

Second trading condition: the amount of requested power is equal to or less than the total amount of the plurality of supplied power.

When there is one power supply apparatus 20, the second trading condition is as follows.

Second trading condition: the amount of requested power is equal to or less than the total amount of the plurality of supplied power.

In a case where the plurality of power supply apparatuses and the plurality of power demand apparatuses are provided as in the fourth embodiment, the third trading condition is as follows.

Third trading condition: the total price of the plurality of supply prices is equal to or less than the total price of the plurality of request prices. Accordingly, any supply operator can acquire the applied supply price by the trading establishment, and any demand operator can acquire the amount of power at the price as applied.

When there is one power demand apparatus 30, the third trading condition is as follows.

Third trading condition: the total prices of the plurality of supply prices is equal to or less than the request price.

When there is one power supply apparatus 20, the third trading condition is as follows.

Third trading condition: the supply price is less than or equal to the total price of the plurality of request prices.

Hereinafter, an operation of power trading management according to the fifth embodiment will be described with reference to FIG. 18. In the fifth embodiment, differences from the first embodiment will be mainly described for the sake of convenience in description. The same components as those of the first to fifth embodiments will be assigned the same reference signs, and the description thereof will be omitted.

Power Trading Management Data

FIG. 18 is an explanatory diagram illustrating an example of the power trading management data in the fifth embodiment. Power trading management data 1800 includes fields 201 to 205 similar to the power trading management data 200 described with reference to FIG. 2.

In the time zone 201 (from 10:00 to 10:59) represented in a row 251, data such as "20-1" as the apparatus ID 307 of the power supply apparatus 20, "2 [MW]" as the power 304 to be supplied, "2 [MWh]" as the amount of power 305 to be supplied, and "20,000 yen" as the (desired supply) price 306 is recorded as the supply operator relevant information 202 based on the application from the supply operator. However, in this time zone 201 (from 10:00 to 10:59), the demand operator relevant information 204 based on the application from the demand operator is not recorded, and the trading is not established.

In the time zone 201 (from 11:00 to 11:59) represented in a row 252, data such as "30-1" as the apparatus ID 307 of the power demand apparatus 30, "1 [MW]" as the (demanded) power 304, "1 [MWh]" as the amount of (demanded) power 305, and "10,000 yen" as the (desired demand) price 306 is recorded as the demand operator relevant information 204 based on the application from the demand operator. However, in this time zone 201 (from 11:00 to 11:59), the supply operator relevant information 202 based on the application from the supply operator is not recorded, and the trading is not established.

Meanwhile, in the time zone 201 (from 10:00 to 11:59) that spans the row 251 and the row 252, data such as "40-1" as the apparatus ID 307 of the power storage and discharge apparatus 40, "2 [MW]" as the power 304 of the storage and discharge, "2 [MWh]" as the amount of power 305 to be stored and discharged, and "3,000 yen" as the (desired storage and discharge) price 306 is recorded as the storage and discharge operator relevant information 203 based on the application from the storage and discharge operator.

Specifically, for example, the time zone 201 which is the supply period of the supply operator relevant information 202 of the row 251 is from 10:00 to 10:59, and is included in the time zone 201 (from 10:00 to 11:59) which is the storage and discharge period of the storage and discharge operator relevant information 203.

Similarly, the time zone 201 which is the request period of the demand operator relevant information 204 of the 252 is from 11:00 to 11:59, and is included in the time zone 201 (from 10:00 to 11:59) which is the storage and discharge period of the storage and discharge operator relevant information 203.

The time zone 201 which is the request period of the demand operator relevant information 204 of the row 252 is from 11:00 to 11:59, and the time zone 201 which is the supply period of the supply operator relevant information 202 of the row 251 is from 10:00 to 10:59 before the request period. Accordingly, in the case of the power trading management data 1800 of FIG. 18, the first trading condition is satisfied.

The amount of supplied power of the supply operator relevant information 202 of the row 251 is 2 [MWh], and the amount of requested power of the demand operator relevant information 204 of the row 252 is 1 [MWh]. Accordingly, in the case of the power trading management data 1800 of FIG. 18, the fourth trading condition is also satisfied.

The supply price of the supply operator relevant information 202 of the row 251 is 20,000 yen, and the request price of the demand operator relevant information 204 of the row 252 is 10,000 yen. Accordingly, in order to satisfy the above inequality (1), in the case of the power trading management data 1800 of FIG. 18, the third trading condition is satisfied.

As stated above, since the demand condition on the demand operator side is a subset of the supply condition on the power supply apparatus 20 side and the power storage and discharge apparatus 40 can absorb the difference in the condition, the trading is established. Accordingly, in the time zone 201 (from 10:00 to 10:59) of the row 251, the power storage and discharge apparatus 40-1 stores the power from the power supply apparatus 20-1. The power 304 and the amount of power 305 mentioned herein are 1 [MW] and 1 [MWh] established as the trading. Meanwhile, in the time zone 201 (from 11:00 to 11:59) of the row 252, the power storage and discharge apparatus 40-1 supplies the power to the power demand apparatus 30-1 by discharging (1 [MW], 1 [MWh]).

Due to the operations described above, when the power supply apparatuses 20, the power demand apparatuses 30, and the power storage and discharge apparatus 40 are combined and the trading of the power can be performed with the condition on the power demand apparatus 30 side as a reference axis, the trading is established, and "T6-1" and "T6-2" are assigned to the trading IDs 205 of the trading management data 1800.

As described above, when the power supply apparatuses 20, the power demand apparatuses 30, and the power storage and discharge apparatus 40 are combined and the power supply apparatus 20 and the power storage and discharge apparatus 40 can satisfy the condition of the power demand apparatus 30, the power trading is established. Accordingly, it is possible to increase the amount of traded power.

Sixth Embodiment

In a sixth embodiment, an example in which the trading establishment is notified when the trading is established in a situation in which the conditions on the supply side and the demand side of the power are different by using the function of the power storage and discharge system 40 in the first to fifth embodiments will be described with reference to FIGS. 19A to 19D. Specifically, for example, the power tradings (T2-1 and T2-2) represented in the frame 102 of FIG. 2 will be described as an example. The same components as those of the first to fifth embodiments will be assigned the same reference signs, and the description thereof will be omitted.

Power Trading Establishment Presentation Data>

FIG. 19A is an explanatory diagram illustrating an example of power trading establishment presentation data for the power supply in the sixth embodiment. Power trading establishment presentation data 1901 for the power supply application is data to be presented to the power supply operator by transmitting a notification indicating that the power trading is established to the supply-side computer 20 as an application source by the power trading management apparatus 10 when the power supply application data is received.

The power trading establishment presentation data 1901 includes fields of a trading ID 1911, a trading result 1912, a trading form 1913, a target apparatus 1914, power 1915 to be traded, the amount of power 1916 to be traded, a transmission period 1917 in which power is transmitted and received, power trading price 1918, storage and discharge usage and nonusage 1919, and storage and discharge usage price 1920.

The trading ID 205 of the power trading management data 200 is stored in the trading ID 1911. The trading result 1912 indicates the establishment of the trading. The trading type 302 of the application source is stored in the trading form 1913. In the case of FIG. 19A, the trading form is "supply". The transmission period 1917 is a period in which power is transmitted and received, and the time zone 201 corresponding to the trading ID 205 of the power trading management data 200 is stored.

The target apparatus ID 1914, the power 1915, the amount of power 1916, and the power trading price 1918 store the supply operator relevant information 202 of the power trading management data 200 in the time zone 201 which is the transmission period 1917. The storage and discharge usage and nonusage 1919 indicates whether or not the storage or discharge is used by the power storage and discharge apparatus 40. The storage and discharge usage price 1920 is price using the storage or discharge by the power storage and discharge apparatus 40.

In the example of the power trading establishment presentation data 1901 illustrated in FIG. 19A, the trading ID 1911 is "T2-1", the trading result 1912 is "establishment", the trading form 1913 is "supply", the target apparatus 1914 is "20-2", the power 1915 to be traded is "1 [MW]", the amount of power 1916 is "1 [MWh]", the transmission period 1917 in which power is transmitted and received is "October 1, from 12:00 to 12:59", the power trading price 1918 is "+10,000 yen", the storage and discharge usage and nonusage 1919 is "usage", and the storage and discharge usage price 1920 is "−1,000 yen".

Here, a case where the power trading price of 1918 is "+10,000 yen" means that the power demand operator pays 10,000 yen by supplying the power. The power trading management apparatus 10 notifies the supply-side computer 20 of the application source that the trading is established by using the storage and discharge function when the storage and discharge usage and nonusage 1919 is "usage". A case where the storage and discharge usage price 1920 is "−1,000 yen" means that the power storage and discharge function is used and the power supply operator of the application source needs to pay 1,000 yen to the storage and discharge operator.

FIG. 19B is an explanatory diagram illustrating an example of the power trading establishment presentation data for the power demand application in the sixth embodiment. The power trading establishment presentation data 1902 for the power demand application is data to be presented to the demand operator by transmitting the demand-side computer 30 of the application source that the power trading is established by the power trading management apparatus 10 when the power demand application data is received. The power trading establishment presentation data 1902 includes field data 1911 to 1920 similar to the power trading establishment presentation data 1901 for the power supply application.

In the example of the power trading establishment presentation data 1902 illustrated in FIG. 19B, the trading ID 1911 is "T2-2", the trading result 1912 is "establishment", the trading form 1913 is "demand", the target apparatus 1914 is "30-2", the power 1915 to be traded is "1 [MW]", the amount of power 1916 is "1 [MWh]", the transmission period 1917 in which power is transmitted and received is "October 1, from 13:00 to 13:59, the power trading price 1918" is "−10,000 yen", the storage and discharge usage and nonusage 1919 is "usage", and the storage and discharge usage price 1920 is "−1,000 yen".

Here, a case where the power trading price 1918 is "−10,000 yen" means that it is necessary to pay 10,000 yen to the supply operator of the power by consuming the power. The power trading management apparatus 10 notifies the demand-side computer 30 of the application source that the trading is established by using the storage and discharge function when the storage and discharge usage and nonusage 1919 is "usage". A case where the storage and discharge usage price 1920 is "−1,000 yen" means that the power storage and discharge function is used and the power demand operator of the application source needs to pay 1,000 yen to the storage and discharge operator.

Figure 19C:
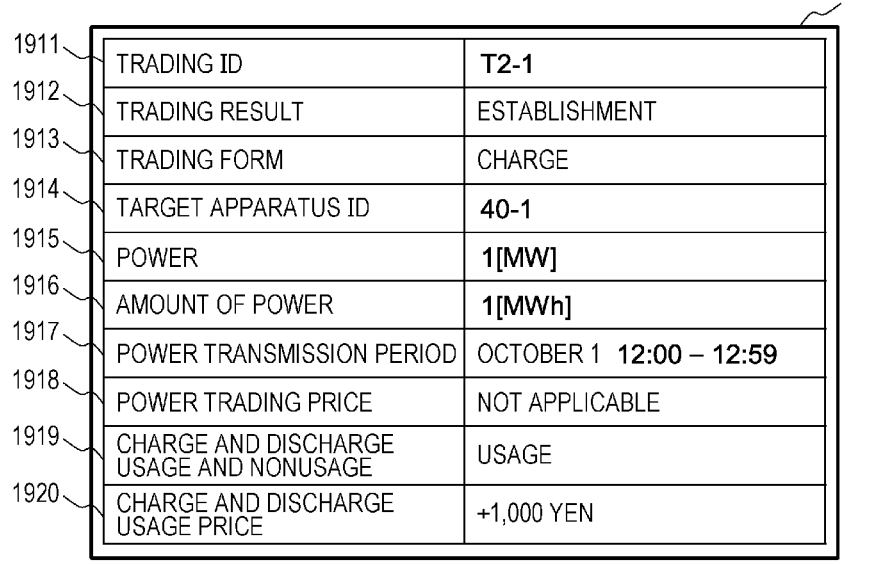
FIG. 19C is an explanatory diagram illustrating an example of power trading establishment presentation data for a power storage application in the sixth embodiment.

FIG. 19C is an explanatory diagram illustrating an example of the power trading establishment presentation data for the power storage application in the sixth embodiment. The power trading establishment presentation data 1903 for the power storage application is data to be presented to the storage and discharge operator by transmitting a notification indicating that the power trading is established to the power-storage-and-discharge-side computer 40 by the power trading management apparatus 10 when the power storage application data is received. The power trading establishment presentation data 1903 includes field data 1911 to 1920 similar to the power trading establishment presentation data 1901 for the power supply application.

In the example of the power trading establishment presentation data 1903 illustrated in FIG. 19C, the trading ID 1911 is "T2-1", the trading result 1912 is "establishment", the trading form 1913 is "storage", the target apparatus 1914 is "40-1", the power 1915 to be traded is "1 [MW]", the amount of power 1916 is "1 [MWh]", the transmission period 1917 in which power is transmitted and received is "October 1, from 12:00 to 12:59", the power trading price 1918 is "not applicable", the storage and discharge usage and nonusage 1919 is "usage", and the storage and discharge usage price 1920 is "+1,000 yen".

Here, a case where the power trading price 1918 is "not applicable" means that there is no supply and consumption of power. The power trading management apparatus 10 notifies the power-storage-and-discharge-side computer 40 that the trading is established by using the storage and discharge function when the storage and discharge usage and nonusage 1919 is "usage". A case where that the storage and discharge usage price 1920 is "+1,000 yen" means that the power storage and discharge function is used and the power supply operator pays 1,000 yen to the storage and discharge operator.

Figure 19D:
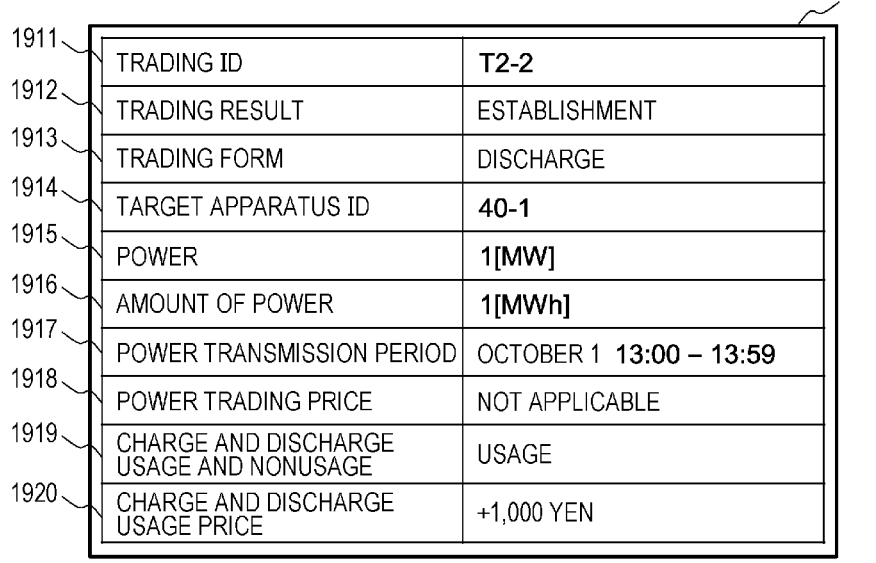
FIG. 19D is an explanatory diagram illustrating an example of power trading establishment presentation data for a power discharge application in the sixth embodiment.

FIG. 19D is an explanatory diagram illustrating an example of the power trading establishment presentation data for the power discharge application in the sixth embodiment. The power trading establishment presentation data 1904 for the power discharge application is data for presenting that the power trading is established when there is the power discharge application. The power trading establishment presentation data 1904 includes field data 1911 to 1920 similar to the power trading establishment presentation data 1901 for the power supply application.

In the example of the power trading establishment presentation data 1904 illustrated in FIG. 19D, the trading ID 1911 is "T2-2", the trading result 1912 is "establishment", the trading form 1913 is "discharge", the target apparatus 1914 is "40-1", the power 1915 to be traded is "1 [MW]", the amount of power 1916 is "1 [MWh]", the transmission period 1917 in which power is transmitted and received is "October 1, from 13:00 to 13:59, the power trading price 1918" is "not applicable", the storage and discharge usage and nonusage 1919 is "usage", and the storage and discharge usage price 1920 is "+1,000 yen".

Here, a case where the power trading price 1918 is "not applicable" means that there is no supply and consumption of power. The power trading management apparatus 10 notifies the power-storage-and-discharge-side computer 40 that the trading is established by using the storage and discharge function when the storage and discharge usage and nonusage 1919 is "usage". A case where the storage and discharge usage price 1920 is "+1,000 yen" means that the power storage and discharge function is used and the power demand operator pays 1,000 yen to the storage and discharge operator.

As described above, when the power trading demand and supply are established, whether or not the trading is established by using the storage and discharge function is notified, and it is recognizable that the trading application that is not established when there is no storage and discharge function is established. The storage and discharge function is effectively utilized, and the amount of traded power is increased. Accordingly, it is possible to increase the effective use of renewable energy which is not be effectively available in the past.

The present invention is not limited to the aforementioned embodiments, and includes various modification examples and equivalent configurations within the gist of the appended claims. For example, the aforementioned embodiments are described in detail in order to facilitate easy understanding of the present invention, and the present invention is not limited to necessarily include all the described components. A part of the configuration of one embodiment may be replaced with the configuration of another embodiment. The configuration of another embodiment may be added to the configuration of one embodiment. Another configuration may be added, removed, and substituted to, from, and into some of the configurations of the aforementioned embodiments.

A part or all of the aforementioned configurations, functions, processing units, and processing means may be realized by hardware by being designed with, for example, an integrated circuit. Alternatively, the processor interprets and executes a program for realizing the functions, and thus, a part or all of the aforementioned configurations, functions, processing units, and processing means may be realized by software.

Information of programs, tables, and files for realizing the functions can be stored in a storage device such as a memory, a hard disk, or a solid state drive (SSD), or a recording medium such as an integrated circuit (IC) card, an SD card, or a digital versatile disc (DVD).

Control lines and information lines illustrate lines which are considered to be necessary for the description, and not all the control lines and information lines necessary in the implementation are necessarily illustrated. Almost all the configurations may be considered to be actually connected to each other.

What is claimed is:

1. A power trading management apparatus in which a power supply apparatus which supplies power, a power demand apparatus which requests power, a power storage and discharge apparatus which stores and discharges power, and a power transmission switching apparatus which switches a power transmission path between the power supply apparatus, the power demand apparatus, and the power storage and discharge apparatus are connected via a power network, and that is connected so as to be able to communicate with a supply-side computer which controls the power supply apparatus, a demand-side computer which controls the power demand apparatus, and the power transmission switching apparatus via a communication network, the power trading management apparatus comprising:
   a processor that executes a program; and
   a storage device that stores the program,
   wherein the processor executes:
   reception processing of receiving power supply application data including an amount of supplied power and a supply period from the supply-side computer, and receiving power demand application data including an amount of requested power and a request period from the demand-side computer,
   determination processing of determining whether or not a first trading condition in which the supply period is a period earlier than the request period is satisfied,
   decision processing of deciding an amount of transmitted power for the power demand apparatus based on at least any one amount of power of the amount of supplied power and the amount of requested power when the first trading condition is satisfied by the determination processing, and
   power transmission control processing of storing the amount of supplied power in the power storage and discharge apparatus from the power supply apparatus in the supply period and discharging the amount of transmitted power decided by the decision processing to the power demand apparatus from the power storage and discharge apparatus in the request period by controlling the power transmission switching apparatus,
   wherein the power supply apparatus is connected so as to able to transmit power to a first power storage and discharge apparatus via a first power transmission switching apparatus, the power demand apparatus is connected so as to be able to transmit power from a second power storage and discharge apparatus via a second power transmission switching apparatus, and the first power transmission switching apparatus and the second power transmission switching apparatus are connected so as to be able to transmit power, and
   wherein in the power transmission control processing, the processor stores the amount of supplied power in the first power storage and discharge apparatus via the first power transmission switching apparatus from the power supply apparatus in the supply period, transmits the amount of supplied power to the second power storage and discharge apparatus from the first power storage and discharge apparatus after the supply period elapses and before the request period is started, and discharges the amount of transmitted power to the power demand apparatus from the second power storage and discharge apparatus via the second power transmission switching apparatus in the request period by controlling the first power transmission switching apparatus and the second power transmission switching apparatus.

2. The power trading management apparatus according to claim 1, wherein, in the decision processing, the processor decides the amount of requested power as the amount of transmitted power when it is determined that the first trading condition is satisfied.

3. The power trading management apparatus according to claim 1, wherein, in the decision processing, the processor decides the amount of supplied power as the amount of transmitted power when it is determined that the first trading condition is satisfied.

4. The power trading management apparatus according to claim 1, wherein, in the decision processing, the processor decides, as the amount of transmitted power, a smaller amount of power among the amount of supplied power and the amount of requested power when it is determined that the first trading condition is satisfied.

5. The power trading management apparatus according to claim 1, wherein
   the processor is connected so as to be able to communicate with a power-storage-and-discharge-side computer that controls the power storage and discharge apparatus via the communication network,
   in the reception processing, the processor receives power storage and discharge application data including an amount of stored and discharged power, a storage period, an amount of discharged power, and a discharge period from the power-storage-and-discharge-side computer,
   the first trading condition is a condition in which the storage period includes the supply period, the discharge period includes the request period, and the supply period is a period earlier than the request period,
   in the determination processing, the processor determines whether or not the first trading condition and a second trading condition in which the power storage and discharge apparatus is able to store the amount of supplied power from the power supply apparatus and is able to discharge the amount of requested power to the power demand apparatus are satisfied, and
   in the decision processing, the processor decides the amount of transmitted power for the power demand apparatus based on the any one amount of power when it is determined that the first trading condition and the second trading condition are satisfied by the determination processing.

6. The power trading management apparatus according to claim 1, wherein
   in the determination processing, the processor determines whether or not a third trading condition in which a supply price of the amount of supplied power and a request price of the amount of requested power match each other is satisfied, and
   in the decision processing, the processor decides the amount of transmitted power for the power demand apparatus based on the any one amount of power when the first trading condition and the third trading condition are satisfied.

7. The power trading management apparatus according to claim 1, wherein
   the power storage and discharge apparatus is a moving object capable of being connected so as to be able to store and discharge power in the first power transmission switching apparatus and the second power transmission switching apparatus and capable of moving between the first power transmission switching apparatus and the second power transmission switching apparatus, and in the power transmission control processing, the processor stores the amount of supplied power in the moving object connected to the first power transmission switching apparatus from the power supply apparatus in the supply period by controlling the first power transmission switching apparatus, and discharges the amount of transmitted power to the power demand apparatus from the moving object connected to the second power transmission switching apparatus in the request period by controlling the second power transmission switching apparatus.

8. The power trading management apparatus according to claim 1, wherein
the power transmission switching apparatus is connected so as to be able to transmit power from a plurality of power supply apparatuses,
the first trading condition is a condition in which the storage period includes the supply period of each of the plurality of power supply apparatuses, the discharge period includes the request period, and all the supply periods are periods earlier than the request period,
in the reception processing, the processor receives the power supply application data from each of a plurality of supply-side computers that controls the plurality of power supply apparatuses,
in the decision processing, the processor decides the amount of transmitted power based on at least any one amount of power of the amount of supplied power and the amount of requested power for each power supply apparatus when it is determined that the first trading condition is satisfied, and
in the power transmission control processing, the processor stores the amount of supplied power in the power storage and discharge apparatus from the plurality of power supply apparatuses in the supply period for each power supply apparatus and discharges the amount of transmitted power to the power demand apparatus from the power storage and discharge apparatus in the request period by controlling the power transmission switching apparatus.

9. The power trading management apparatus according to claim 1, wherein
the power transmission switching apparatus is connected so as to be able to transmit power to a plurality of power demand apparatuses,
the first trading condition is a condition in which the discharge period includes the request period of each of the plurality of power demand apparatuses, and the supply period is a period earlier than any request period,
in the reception processing, the processor receives the power demand application data from each of a plurality of demand-side computers that controls the plurality of power demand apparatuses,
in the decision processing, the processor decides the amount of transmitted power for each power demand apparatus based on the amount of supplied power and the amount of requested power when it is determined that the first trading condition is satisfied, and
in the power transmission control processing, the processor stores the amount of supplied power in the power storage and discharge apparatus from the power supply apparatus in the supply period and discharges the amount of transmitted power for each power demand apparatus to each of the plurality of power demand apparatuses from the power storage and discharge apparatus in the request period for each power demand apparatus by controlling the power transmission switching apparatus.

10. The power trading management apparatus according to claim 1, wherein
the power transmission switching apparatus is connected so as to be able to transmit power from a plurality of power supply apparatuses, and is connected so as to be able to transmit power to a plurality of power demand apparatuses,
the first trading condition is a condition in which the storage period includes the supply period of each of the plurality of power supply apparatuses, the discharge period includes the request period of each of the plurality of power demand apparatuses, and all the supply periods are periods earlier than any request period,
in the reception processing, the processor receives the power supply application data from each of a plurality of supply-side computers that controls the plurality of power supply apparatuses, and receives the power demand application data from each of a plurality of demand-side computers that controls the plurality of power demand apparatuses,
in the decision processing, the processor decides the amount of transmitted power for each power demand apparatus based on the amount of supplied power for each power supply apparatus and the amount of requested power for each power demand apparatus when it is determined that the first trading condition is satisfied, and
in the power transmission control processing, the processor stores the amount of supplied power in the power storage and discharge apparatus from each power supply apparatus in the supply period for each power supply apparatus and discharges the amount of transmitted power for each power demand apparatus to each of the plurality of power demand apparatuses from the power storage and discharge apparatus in the request period for each power demand apparatus by controlling the power transmission switching apparatus.

11. The power trading management apparatus according to claim 5, wherein the second trading condition is a condition in which the amount of supplied power and the amount of stored power match each other and the amount of requested power and the amount of discharged power match each other.

12. The power trading management apparatus according to claim 5, wherein
the second trading condition is a condition in which the amount of requested power is equal to or less than the amount of supplied power, and
in the decision processing, the processor decides, as the amount of transmitted power, the amount of power which is equal to or more than the amount of requested power and is equal to or less than the amount of supplied power when it is determined that the first trading condition and the second trading condition are satisfied by the determination processing.

13. The power trading management apparatus according to claim 11, wherein
in the decision processing, the processor decides the amount of supplied power as the amount of transmitted power when it is determined that the first trading condition is satisfied and the second trading condition is not satisfied by the determination processing.

14. A power trading system in which a power supply apparatus which supplies power, a power demand apparatus which requests power, a power storage and discharge apparatus which stores and discharges power, and a power transmission switching apparatus which switches a power transmission path between the power supply apparatus, the power demand apparatus, and the power storage and discharge apparatus are connected via a power network and that includes a supply-side computer which controls the power supply apparatus, a demand-side computer which controls the power demand apparatus, and a power trading management apparatus connected so as to be able to communicate with the power transmission switching apparatus, the supply-side computer, the demand-side computer, and the power transmission switching apparatus via a communication network, wherein the power trading management apparatus includes a processor that executes a program and a storage device that stores the program, the processor executes reception processing of receiving power supply application data including an amount of supplied power and a supply period from the supply-side computer, and receiving power demand application data including an amount of requested power and a request period from the demand-side computer, determination processing of determining whether or not a first trading condition in which the supply period is a period earlier than the request period is satisfied, decision processing of deciding an amount of transmitted power for the power demand apparatus based on at least any one amount of power of the amount of supplied power and the amount of requested power when it is determined that the first trading condition is satisfied by the determination processing, and power transmission control processing of storing the amount of supplied power in the power storage and discharge apparatus from the power supply apparatus in the supply period and discharging the amount of transmitted power decided by the decision processing to the power demand apparatus from the power storage and discharge apparatus in the request period by controlling the power transmission switching apparatus, wherein the power supply apparatus is connected so as to able to transmit power to a first power storage and discharge apparatus via a first power transmission switching apparatus, the power demand apparatus is connected so as to be able to transmit power from a second power storage and discharge apparatus via a second power transmission switching apparatus, and the first power transmission switching apparatus and the second power transmission switching apparatus are connected so as to be able to transmit power, and wherein in the power transmission control processing, the processor stores the amount of supplied power in the first power storage and discharge apparatus via the first power transmission switching apparatus from the power supply apparatus in the supply period, transmits the amount of supplied power to the second power storage and discharge apparatus from the first power storage and discharge apparatus after the supply period elapses and before the request period is started, and discharges the amount of transmitted power to the power demand apparatus from the second power storage and discharge apparatus via the second power transmission switching apparatus in the request period by controlling the first power transmission switching apparatus and the second power transmission switching apparatus.

* * * * *